(12) United States Patent
Key

(10) Patent No.: US 7,671,338 B2
(45) Date of Patent: *Mar. 2, 2010

(54) APPARATUS AND METHOD FOR ANALYZING RELATIVE OUTWARD FLOW CHARACTERIZATIONS OF FABRICATED FEATURES

(75) Inventor: Douglas E. Key, Batavia, OH (US)

(73) Assignee: Meyer Tool, Inc., Cincinnati, OH (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/034,761

(22) Filed: Feb. 21, 2008

(65) Prior Publication Data

US 2008/0237466 A1   Oct. 2, 2008

Related U.S. Application Data

(63) Continuation-in-part of application No. 11/424,084, filed on Jun. 14, 2006, now Pat. No. 7,388,204.

(51) Int. Cl.
*G01J 5/02* (2006.01)
(52) U.S. Cl. .................... 250/340; 250/339.03
(58) Field of Classification Search ................ 250/340, 250/339.03
See application file for complete search history.

(56) References Cited

U.S. PATENT DOCUMENTS

| | | | |
|---|---|---|---|
| 3,564,247 A * | 2/1971 | Packer | 378/54 |
| 3,566,669 A | 3/1971 | Lawrence et al | |
| 4,644,162 A | 2/1987 | Bantel et al. | |
| 5,054,087 A | 10/1991 | Carbon et al. | |
| 5,111,046 A | 5/1992 | Bantel | |
| 5,125,035 A | 6/1992 | McCarthy et al. | |
| 5,168,747 A | 12/1992 | Weaver et al. | |
| 6,367,968 B1 | 4/2002 | Ringermacher et al. | |
| 6,367,969 B1 | 4/2002 | Ringermacher et al. | |
| 6,394,646 B1 | 5/2002 | Ringermacher et al. | |
| 6,422,743 B1 | 7/2002 | Nirmalan et al. | |
| 6,516,603 B1 * | 2/2003 | Urbach et al. | 60/39.3 |
| 6,570,175 B2 | 5/2003 | Bales et al. | |
| 6,585,408 B2 | 7/2003 | El-Gabry et al. | |
| 6,711,506 B2 | 3/2004 | Bales et al. | |
| 6,732,582 B2 | 5/2004 | Bunker et al. | |
| 6,750,454 B2 | 6/2004 | Brown et al. | |

(Continued)

OTHER PUBLICATIONS

S.V. Ekkad et al, A Transient Infrared Thermography Method for Simultaneous Film Cooling Effectiveness and Heat Transfer Coefficient Measurements From A Single Test, Journal of Turbomachinery, Oct. 2004, vol. 126, pp. 597-603, ASME, USA.

(Continued)

*Primary Examiner*—David P Porta
*Assistant Examiner*—Mindy Vu
(74) *Attorney, Agent, or Firm*—Wood, Herron & Evans, LLP

(57) ABSTRACT

An apparatus and method for characterizing gas flow through features fabricated in a hollow part. A pressure regulated cooled gas is applied to an interior of the part to the features fabricated in the part. At the same time, a pressure regulated heated gas is applied to an exterior part skin; and the heated gas has a controlled temperature differential from the pressure regulated cooled gas applied to the part interior. An infrared signature of escaping gas and the surrounding part skin is analyzed by a classification method to identify acceptable and unacceptable fabricated features.

22 Claims, 15 Drawing Sheets

U.S. PATENT DOCUMENTS

| | | |
|---|---|---|
| 6,804,622 B2 | 10/2004 | Bunker et al. |
| 6,909,800 B2 | 6/2005 | Vaidyanathan |
| 2003/0128736 A1 | 7/2003 | Dalio et al. |

OTHER PUBLICATIONS

M. Vollmer et al, Challenges in Infrared Imaging: Low Emissivities of Hot Gases, Metals, and Metallic Cavities, InfraMation 2004 Proceedings, Jul. 27, 2004, 10 pages.

R.D. Rosemau et al, Aircraft Engine Blade Cooling Holes Detection and Classification from Infrared Images, Proceedings of the SPIE, Mar. 1999, vol. 3588, pp. 85-93.

A. Lapsa, Fun With the Shack-Hartmann, Space Nanotechnology Laboratory, Massachusetts Institute of Technology, Aug. 15, 2003, 2 pages.

* cited by examiner

| $X_{n-1}Y_{n-1}$ | $X_nY_{n-1}$ | $X_{n+1}Y_{n-1}$ |
| --- | --- | --- |
| $X_{n-1}Y_n$ | $X_nY_n$ | $X_{n+1}Y_n$ |
| $X_{n-1}Y_{n+1}$ | $X_nY_{n+1}$ | $X_{n+1}Y_{n+1}$ |
FIG. 5
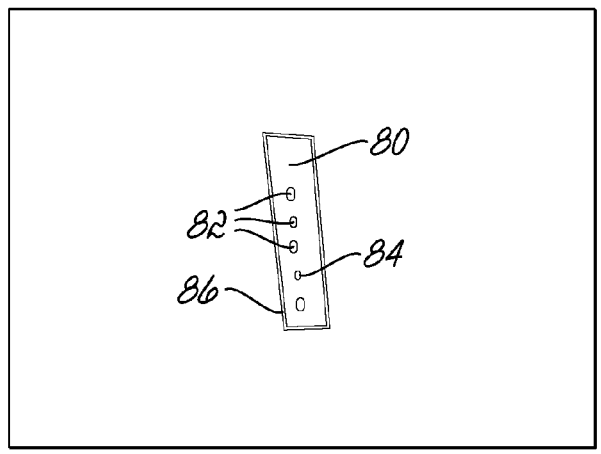
FIG. 6A
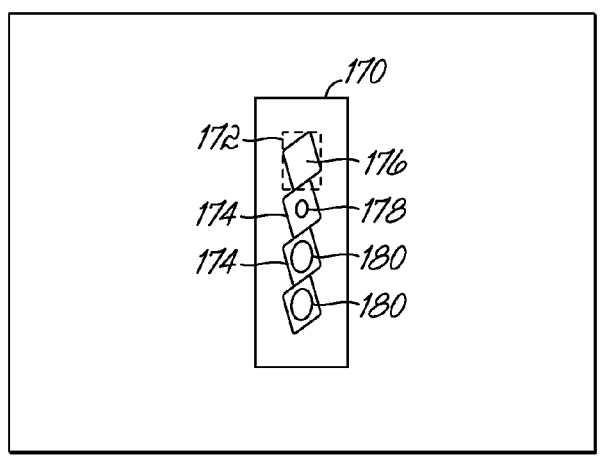
FIG. 6B

APPARATUS AND METHOD FOR ANALYZING RELATIVE OUTWARD FLOW CHARACTERIZATIONS OF FABRICATED FEATURES

FIELD

The present invention relates to manufacturing gas turbine engine components and, more particularly, to inspecting complex cooling holes through a surface of a gas turbine engine component.

BACKGROUND

During operation, gas turbine engines, whether used for flight or stationary power generation, develop extremely high temperature and high velocity gases in a combustor portion of the engine. These gases are ducted on blades of a turbine rotor to cause rotation of the rotor and are redirected by the stator vanes onto additional rotor blades to produce more work. Because of the high heat of the gases, it is desirable to cool the blades and vanes to prevent damage and, to extend the useful life of, these engine components. It is known in the art that a turbine component such as that shown in FIG. 16 can be cooled by film cooling that is provided by a plurality of fabricated features, for example, cooling holes.

A commonly used method of cooling a turbine component 20 is to duct cooling air through internal cavities or passages and then vent the cooling air through a plurality of cooling holes 22. This air cools internal surfaces of the component by convection and cools the components outer surfaces by film cooling. The cooling holes 22 are typically formed along a line generally parallel to, and a selected distance from, a trailing edge 24 of the component to provide a film of cooling air over a surface of the component when the cooling holes discharge air during engine operation. Other rows or arrays of cooling holes or vents may be formed in the blade and vane components of a rotor or stator of a turbine depending upon design constraints.

To facilitate the distribution of the cooling air substantially completely over the convex and concave surfaces of the blade airfoil or platform, as shown in FIG. 17, the upstream end of each cooling hole 22 has a generally cylindrical, inlet portion 26 that extends from a location 28 inside of a wall of the component 20. At the location 28, the cooling hole 22 then flares or diverges to provide a discharge portion 30 that terminates on an exterior surface 32 of the component 20 to be cooled by the air flow. The shape of the discharge end functions as a diffuser to reduce the velocity of the cooling airstreams being discharged from the cooling holes 22. The lower velocity cooling airstreams are more inclined to cling to the surface 32 for improved cooling. High quality cooling holes 22 with diffusers 30 provide superior performance but are costly and difficult to manufacture.

After the cooling holes have been manufactured, it is necessary to inspect each of the holes to determine whether it exists and is properly formed as a complex hole. One method of inspection is a manual method in which an inspector is provided with a drawing of the desired hole pattern and a pin. The inspector first confirms that a hole exists at each location identified by the pattern; and then, the inspector inserts the pin through each of the holes to determine whether the hole is properly drilled as a through-hole. As can be appreciated, such an inspection process is highly repetitive, tedious and stressful for the inspector and, in addition, is expensive and inefficient for the manufacturer of the turbine component.

Other known hole inspection processes are automated and utilize a laser or a flow of fluid through the holes. The flowing fluid used most commonly is either air or water. In the case of air, the mass of air flowing through a feature can be measured. With water, a visual signal of a flow pattern is possible. These methods need a human visual check or physical measurement of a single feature to characterize its flow condition. All of these known methods are time-consuming and rely on human intervention to perform the characterization which leads to errors.

Thus, there is a need for an inspection apparatus and process that can automatically inspect and identify qualitative characteristics of complex cooling features in gas turbine components faster, more precisely and less expensively than known inspection apparatus and processes.

SUMMARY

The present invention provides an inspection apparatus and process that accurately and quickly determine the flow characteristics of cooling features fabricated in gas turbine blades. With the inspection apparatus and process of the present invention, the flow characteristics are easy to interpret; and thus, the inspection apparatus and process are faster, more error-free and less expensive than known tactile and visual inspection processes. The inspection apparatus of the present invention provides an automatic process and thus, removes the chance of human error. Therefore, the inspection apparatus of the present invention is especially useful for inspecting a presence and quality of a large number of complex cooling holes in gas turbine component.

In a first embodiment, an apparatus for inspecting features extending from a cavity within a structure to an outer surface of the structure has a thermal imaging device with a lens. A positioning system supports the thermal imaging device and is operable to position the lens at a desired position and orientation with respect to one of the features. A heating component is also supported by the positioning system and is operable to heat the outer surface around the one of the features. A flow controller is connected to a first source of gas and operable to supply a pressure regulated flow of gas, and a chiller receives the pressure regulated flow of gas and provides a pressure regulated flow of cooled gas into the cavity and to the one of the features. A programmable control is in electrical communications with the thermal imaging device, the positioning system, the heating component, the flow controller and the chiller. The programmable control is operable to first, heat the outer surface around the one of the features, and thereafter, cause the pressure regulated of cooled gas to flow into the cavity. The programmable control is further operable to cause the thermal imaging device to capture and save thermal images of the outer surface including the one of the features. In different aspects of this embodiment, the heating component may heat by thermal radiation and/or thermal convection.

Another embodiment is a method of inspecting features extending from a cavity within a structure to an outer surface of the structure first positions a thermal imaging device at a desired position and orientation with respect to one of the features. The area of the outer surface including the one of the features is heated; and thereafter, a pressure regulated flow of a cooled gas is provided to the cavity to the one of the features. A first thermal image of the area of the outer surface including the one of the features is captured and stored. The pressure regulated flow of the cooled gas is terminated, and the above process is repeated for others of the features. In different aspects of this embodiment, multiple first thermal images may be captured at different times during the flow of the cooled gas. Further, multiple second thermal images of the area of the outer surface may be captured and saved at different times during the heating of the area of the outer surface.

A still further embodiment is a method of inspecting a plurality of features extending from a cavity within a structure to an outer surface of the structure by analyzing saved thermal images of an area of the outer surface including the plurality of features. The thermal images were captured and saved at different times in response to first, heating the area of the surface, and thereafter, providing a cooled gas into the cavity and to the plurality of features. The method first identifies a first thermal image captured after providing the cooled gas into the cavity. The first thermal image is an array of pixels of the area of the surface including the plurality of features, wherein each pixel represents a temperature. A plurality of standard deviations of temperatures is determined, wherein each of the plurality of standard deviations is determined by temperatures represented by pixels within a boundary of a different one of the features. An average of the plurality of standard deviations of temperatures is determined, and a threshold temperature using the average of the plurality of standard deviations of temperatures is determined. A minimum temperature represented by pixels in the difference array within boundaries of respective ones of the plurality of features is determined. Thereafter, a number of significant pixels within the boundary of one of the features is identified. Each significant pixel represents a temperature less than a sum of the threshold temperature plus the minimum temperature, and the number of significant pixels represents an area of the one of the features allowing a desired flow of the cooled gas. The one of the features is identified as a good feature in response to the number of significant pixels being greater than a predetermined number, and the above process is iterated for each of the plurality of features.

Yet another embodiment is a method of inspecting a plurality of features extending from a cavity within a structure to an outer surface of the structure by analyzing saved thermal images of an area of the outer surface including the plurality of features. The thermal images were captured and saved at different times in response to first, heating the area of the surface, and thereafter, providing a cooled gas into the cavity and to the plurality of features. A first thermal image and a second thermal image are captured after providing the cooled gas into the cavity. The second thermal image was captured later in time than the first thermal image. The first and the second thermal images are respective arrays of pixels of an area of the outer surface that includes the plurality of features, wherein each pixel represents a temperature. A plurality of first standard deviations of temperatures is determined, wherein each of the plurality of first standard deviations is represented by pixels within a boundary of a different one of the features in the first thermal image. A plurality of second standard deviations of temperatures is determined, wherein each of the plurality of second standard deviations is represented by pixels within a boundary of a different one of the features in the second thermal image. A feature is identified as being blocked in response to temperatures represented by pixels within a boundary of the feature in the second thermal image not being lower than temperatures represented by pixels within a corresponding boundary of the feature in the first thermal image. A feature in the second thermal image is identified as being good in response to a number of significant pixels within a boundary of the feature representing temperatures lower than surrounding pixels within the boundary of the feature.

A further embodiment of the invention is a method of inspecting a plurality of features extending from a cavity within a structure to an outer surface of the structure by analyzing saved thermal images of an area of the outer surface including the plurality of features. The thermal images were captured and saved at different times in response to first, heating the area of the surface, and thereafter, providing a cooled gas into the cavity and to the plurality of features. Identifying a first thermal image that was captured before providing the cooled gas into the cavity and a second thermal image that was captured after providing the cooled gas into the cavity. The first and the second thermal images are respective arrays of pixels of an area of the outer surface that includes the plurality of features, wherein each pixel represents a temperature. A difference array of pixels is created, wherein each difference array pixel element equals a difference in temperature between corresponding pixel elements of the first thermal image and the second thermal image. A plurality of standard deviations of temperatures is determined using pixels in the difference array, wherein each of the plurality of first standard deviations is determined by temperatures represented by pixels within a boundary of a different one of the features. An average of the plurality of standard deviations of temperatures is determined as is a threshold temperature using the average of the plurality of standard deviations of temperatures. A minimum temperature represented by pixels in the difference array within boundaries of respective ones of the plurality of features is determined. A number of significant pixels within a boundary of a feature is determined, wherein each significant pixel represents a temperature less than a sum of the threshold temperature plus the minimum temperature. The number of significant pixels represents an area of the feature allowing a desired flow of the cooled gas. The feature is identified as a good feature in response to the number of significant pixels being greater than a predetermined number.

These and other objects and advantages of the present invention will become more readily apparent during the following detailed description taken in conjunction with the drawings herein.

BRIEF DESCRIPTION OF THE DRAWINGS

FIG. 5 is a representation of eight-border coordinates used to determine a feature using the process of FIG. 3.

FIG. 6A is a representation of an image of infrared signatures for the group of features shown in FIGS. 1 and 2 when processed according to the process shown in FIG. 3.

FIG. 6B is a representation of an image of infrared signatures for a group of features using a data acquisition method of FIG. 10 and a data analysis method, for example, as shown and described with respect to FIGS. 11, 14 and 15.

DETAILED DESCRIPTION

Figure 1:
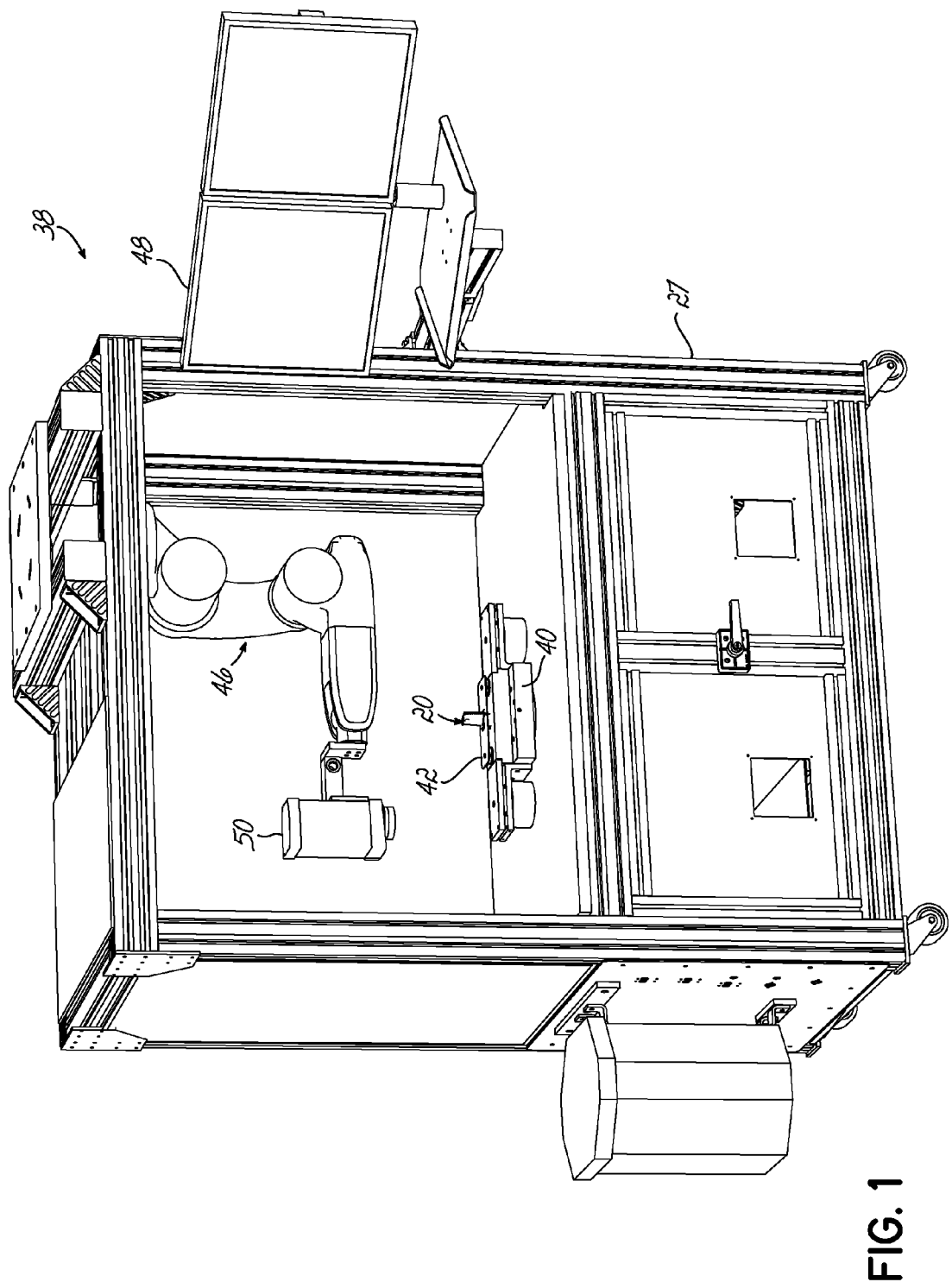
FIG. 1 is a perspective view of an exemplary embodiment of an automated inspection system for inspecting a complex feature fabricated in a part
Figure 2:
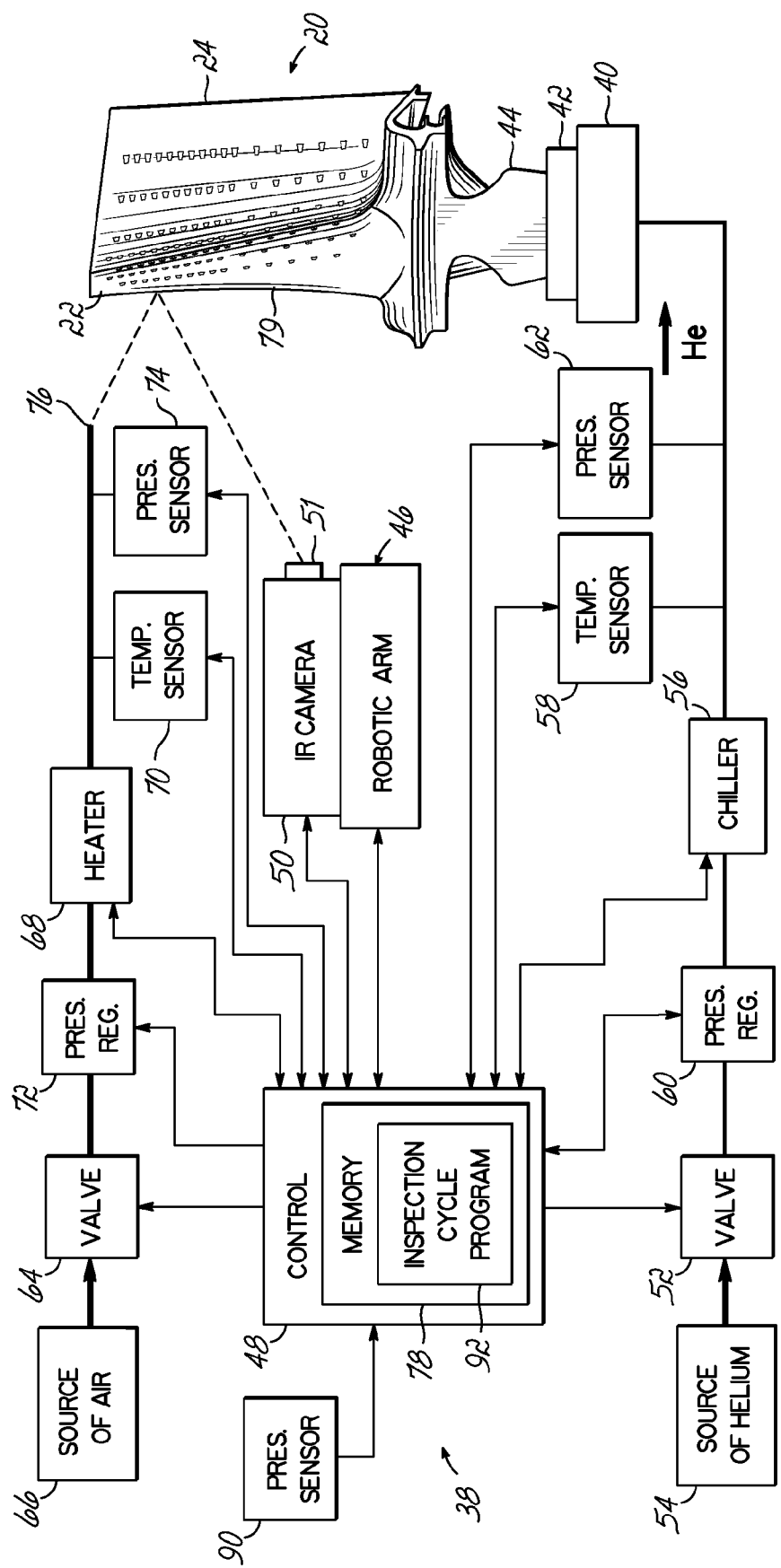
FIG. 2 is an overall schematic diagram of a first exemplary embodiment of the automated inspection system shown in FIG. 1.
Figure 8:
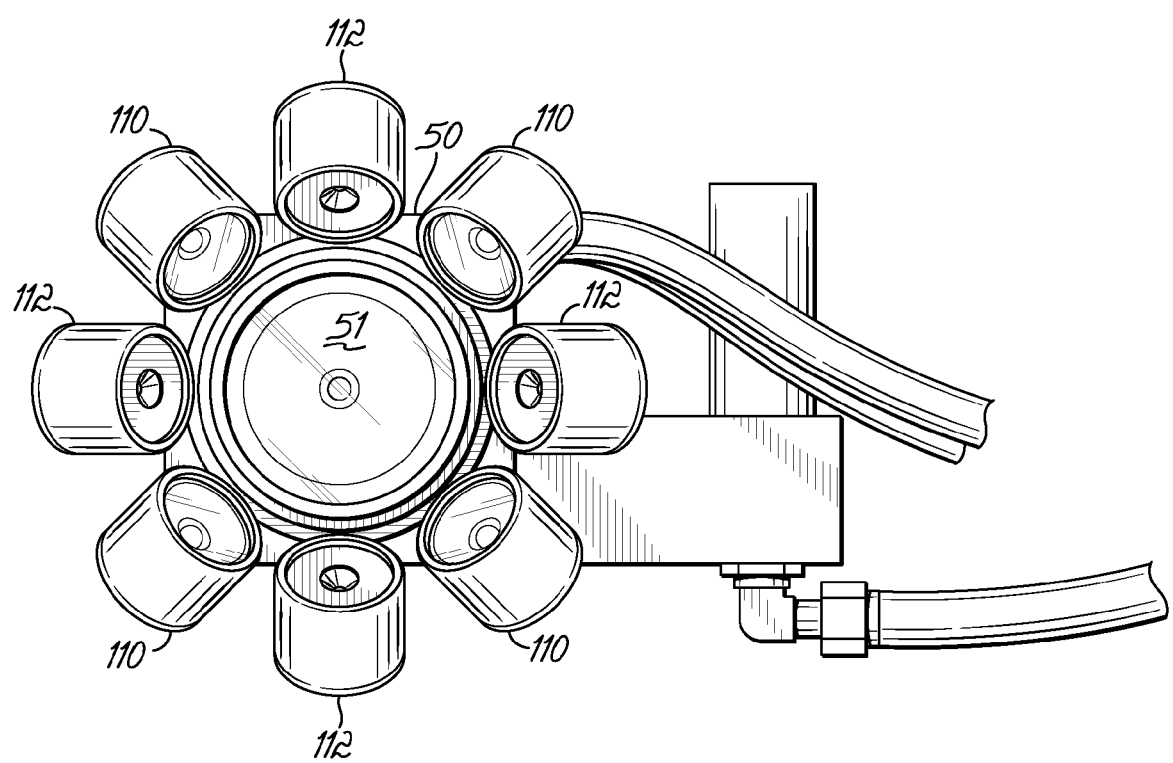
FIG. 8 is a front elevation view of an IR camera lens illustrating and array of IR emitters and gas discharge nozzles.
Figure 9:
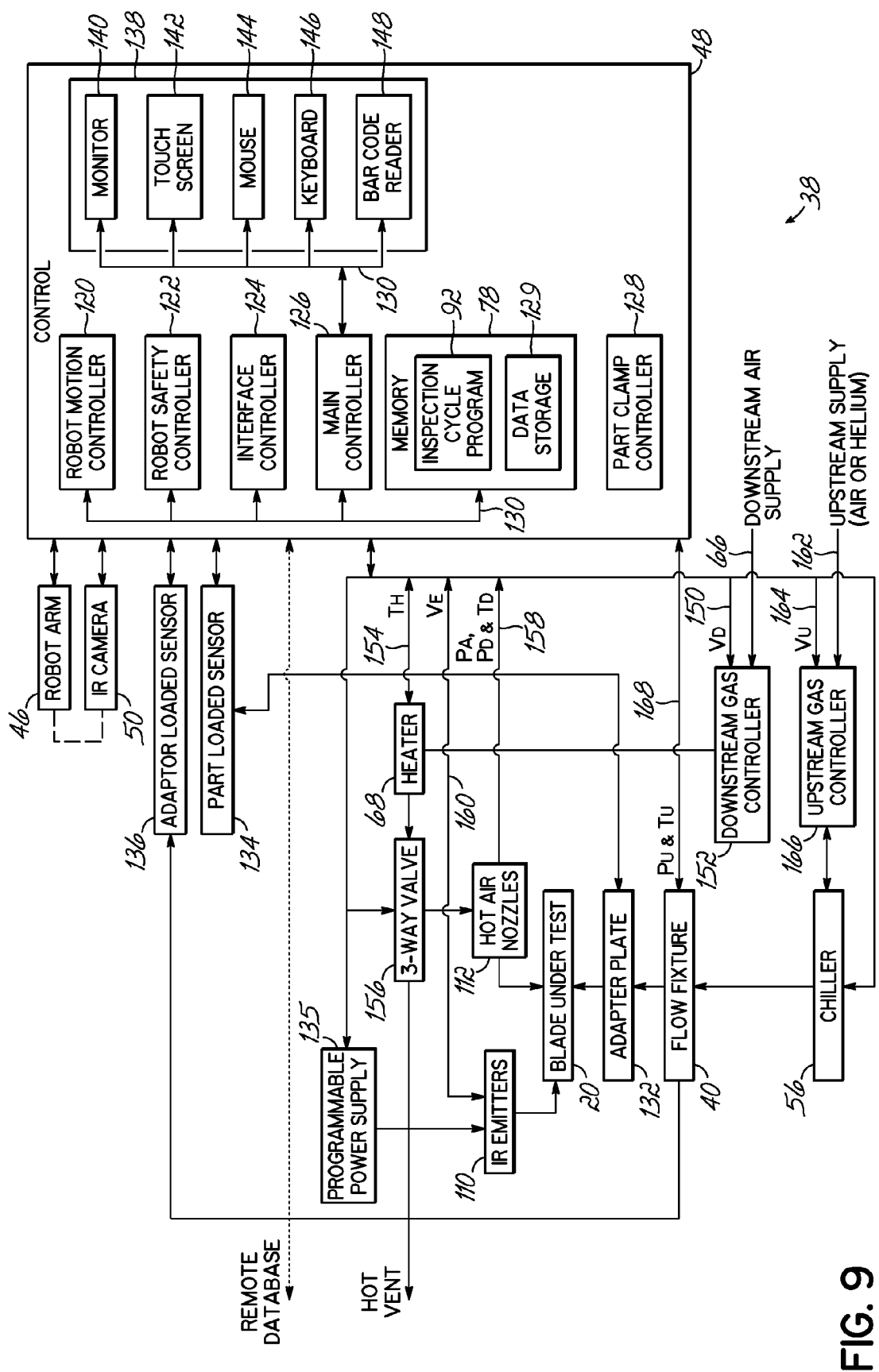
FIG. 9 is an overall schematic diagram of a further exemplary embodiment of the automated inspection system of FIG. 1.

Referring to FIGS. 1 and 2, one example of a feature inspection system 38 is used to inspect fabricated features in a part, for example, air cooling holes 22 in a known turbine blade 20 as described with respect to FIGS. 8 and 9. The blade 20 is supported in a holding fixture 40; and a gas tight seal 42, for example, a molded urethane seal, is formed around an inlet opening at a base 44 of the blade 20. A robotic arm 46 is mounted in a cabinet 27 and is controlled by a programmable control 48 also mounted on the cabinet 27. The robotic arm 46 is operable to position a thermal imaging device, for example, an infrared (IR) radiometer or camera 50, with respect to the blade 20. In one exemplary embodiment, the robotic arm 46 is mounted upside-down above the blade 20, so that the robotic arm 46 can be moved to different positions and orientations that permit the IR camera 50 to provide thermal images of all of the fabricated blade features 22 to be inspected. For purposes of this document, a position refers to a point, for example, a center point of the IR camera lens 51, that is located with respect to a three dimensional linear coordinate system, for example, an x, y, z position. Orientation refers to a placement of the IR camera lens centerline 100 (FIG. 2A) in a desired direction with respect to the outer surface 79. The robotic arm 46 may be one of several commercially available six-axes robot arms, for example, a six-axes robot arm commercially available from DENSO Robotics of Long Beach, Calif. The IR camera 50 is an uncooled IR detector array consisting of 76,800 micro bolometer elements arranged in a pattern that is 320 elements wide by 240 elements high. The IR camera 50 is capable of detecting electromagnetic energy in the range of 7.5-13 micrometers and may be one of several commercially available cameras such as those available from FLIR Systems, Inc. of Wilsonville, Oreg.

In a feature inspection cycle, the IR camera 50 is positioned at a desired position and orientation with respect to the blade; and the control 48 commands a first valve 64 to open, which allows air from a source of pressurized air 66 to enter a heater 68. The source of pressurized air provides clean air, for example, air with an air dew point no greater than +30 F., no particulate size greater than 1 micron and an oil content less than 10 PPM weights.

The control 48 is also electrically connected to the heater 68 and a first temperature sensor 70 providing a first temperature feedback signal. The control 48 uses the first temperature feedback signal and a known PID control to operate the heater 68 and bring the air temperature to a range of about 70-315 degrees Fahrenheit. A first gas pressure regulator 72 is electrically connected to, and operable by, the control 48 to provide the air at a pressure in a range of about 0.05-3.0 pound(s) per square inch gauge ("PSIG"), thereby providing a desired flow of the warmer first gas. This warmer air passes through a nozzle 76 and is applied over an area of a blade outer surface or skin 79 that surrounds the various features 22 being inspected. The nozzle 76 may simply be an open end of a tube positioned adjacent the camera lens 51 and directed toward one or more features being captured by the IR camera 50. In an alternative exemplary embodiment shown in FIG. 2A, the nozzle 76 may be an annular piece or ring 94 sized to be mounted around an IR camera lens 51. An annular gas passage 96 intersects a number of angled gas discharge passages 98 located circumferentially around the annular piece 94 and hence, the IR camera lens 51. The gas discharge passages 98 may be angled to intersect a centerline 100 at generally a common point 102, and thus, the discharge passages 98 are angled or directed toward the one or more features to be captured by the IR camera 50. As will be appreciated, in other embodiments, the nozzle 76 may alternatively be one or more devices that are attached to the robotic arm 46 and operative to direct a gas over a portion of the surface 79 that is a target area of the IR camera 50.

Simultaneously with opening the first valve 64, the control 48 commands a second valve 52 to open, which allows a helium gas from a source of helium gas 54 to enter a chiller 56. The control 48 is also electrically connected to the chiller 56 and a second temperature sensor 58 providing a second temperature feedback signal. The control 48 uses the second temperature feedback signal and a known PID control to operate the chiller 56 and bring the air to a temperature in a range of about 25-70 degrees Fahrenheit. A second gas pressure regulator 60 is electrically connected to, and operable by, the control 48 to maintain the helium at a pressure in a range of about 0.1-35 PSIG, thereby providing a desired flow of the cooler second gas. The chilled and pressurized helium gas is then applied through the fixture 40 and into an interior cavity through an opening at the base 44 of the blade 20 and allowed to escape through the various features 22 that are being inspected.

An initial pre-inspection cycle in a range of about 1-30 seconds is used to purge air from an interior of the blade 20, and the blade 20 is brought to a desired temperature. A control memory 78 stores a hole inspection application program 92 that is operable to inspect the blade features 22 with the IR camera 50 and analyze detected temperatures to identify a feature present, partial feature present or an absence of a feature. An exemplary embodiment of one process of the inspection cycle program 92 for acquiring data relating to features of the part and analyzing that data is shown in FIG. 3.

Figure 3:
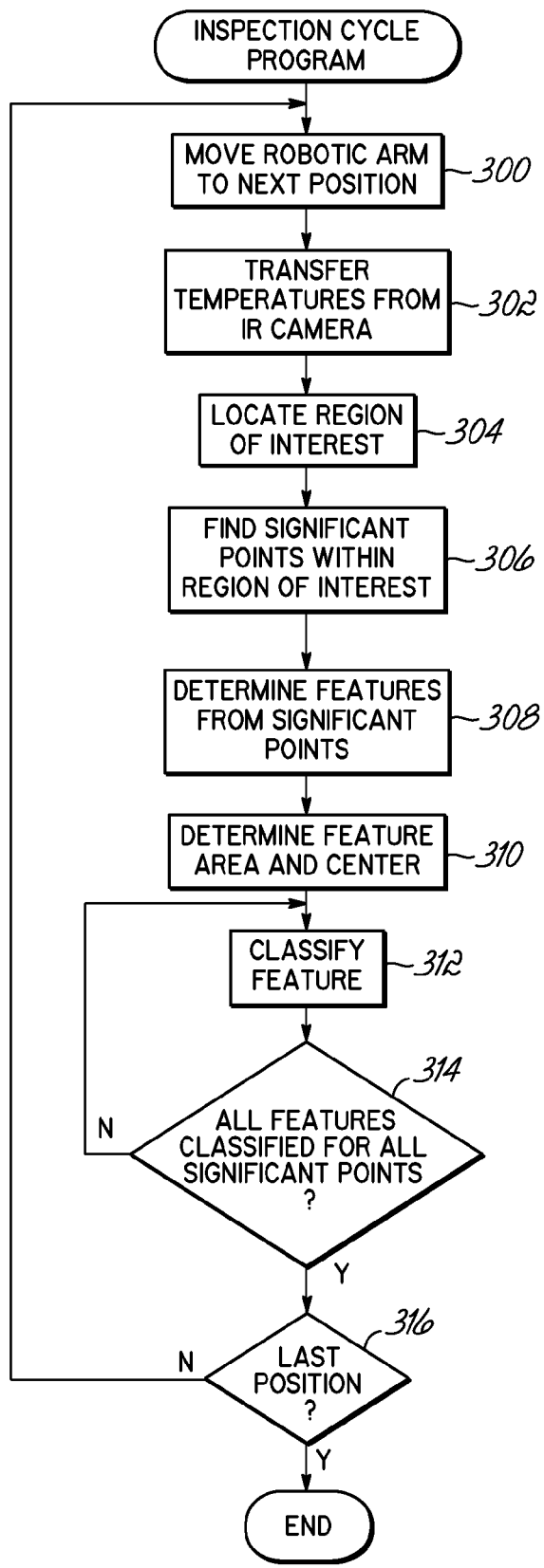
FIG. 3 is a flowchart of an exemplary embodiment of a process for analyzing a raw infrared image using the embodiments of FIGS. 1, 2 and 7.

Referring to FIG. 3, the control 48 first, at 300, commands the robotic arm 46 to move the IR camera 50 to a first position and orientation with respect to the blade 20. The IR camera 50 is operated by the control 48 to capture a raw image in an X-Y pattern. The X-Y pattern is an array or grid of 320 temperatures in the X-axis and 240 temperatures in the Y-axis, for total of 76,800 floating-point temperatures. In this exemplary embodiment, the IR camera 50 is operable to convert the X-Y temperature grid pattern to corresponding digital signals and store them in memory 78.

The control 48 then, at 302, commands a transfer of the temperature grid pattern from the IR camera 50 to the control memory 78, thereby ending the first data acquisition portion of the inspection cycle program of FIG. 3. Next, the inspection cycle program initiates an exemplary first data analysis method. At 304, the entire temperature grid pattern is first analyzed to locate a first region of interest. As will subsequently be described, a region of interest is one or more of the features 22 that have been previously identified in a setup cycle. Therefore, for each programmed IR camera position, one or more regions of interest are stored in the memory 78; and a region can be imposed on, or identified within, the stored X-Y temperature grid pattern.

Figure 4:
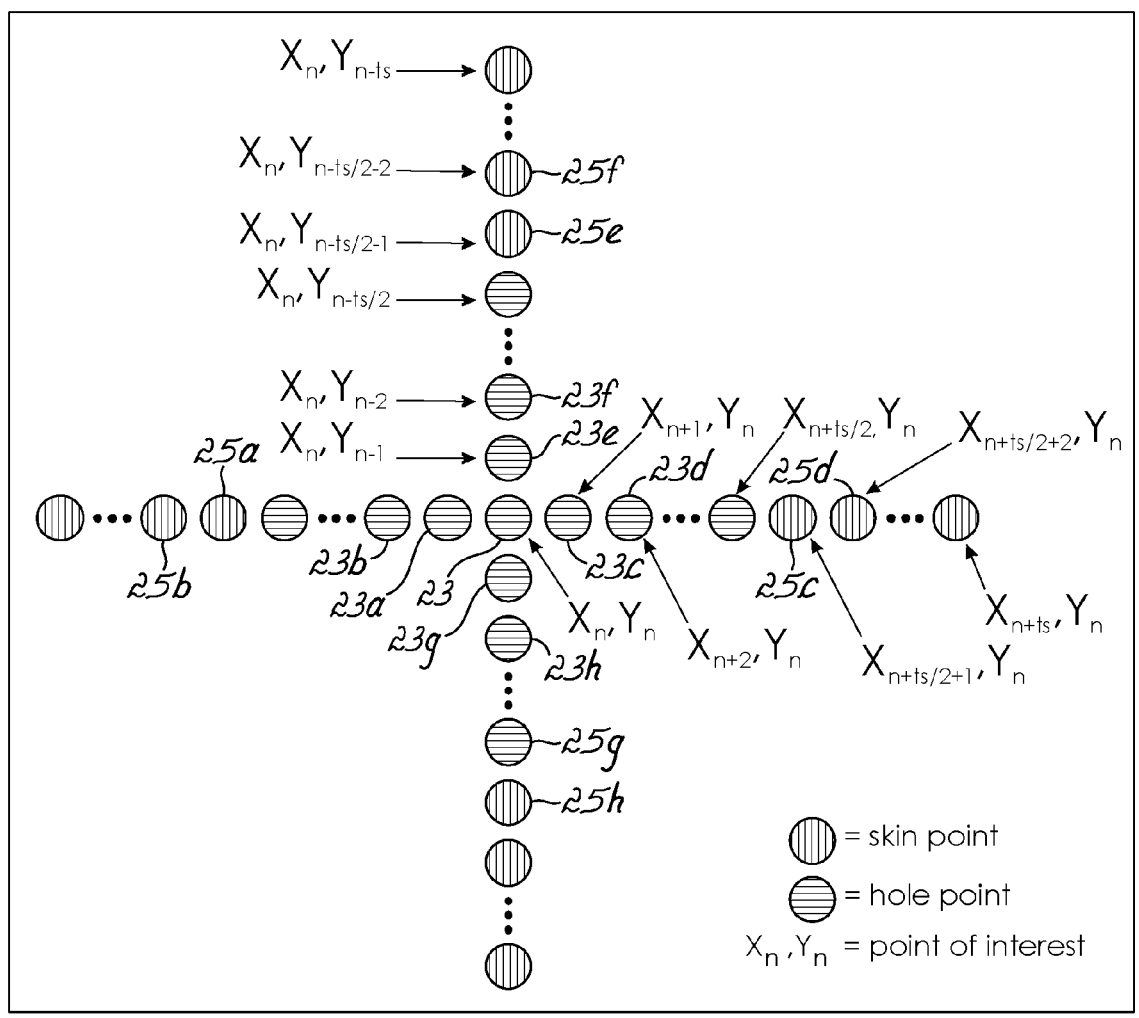
FIG. 4 is an exemplary representation of a point summing cross pattern used in a significant point algorithm with the process shown in FIG. 3.

Thereafter, at 306, a "significant point" detection process begins within a chosen region of interest; and the significant point detection process is used to analyze each X-Y temperature point in the grid pattern of a region of interest. The analysis of each X-Y temperature point begins by summing a first X-Y temperature point with points directly next to it in a first cross pattern to determine an average temperature. A cross pattern size, that is, the number of points to be summed in the four directions from the first point, is determined by a selected target size setting of even numbers in a range of about 2-20 points. The cross pattern size is chosen during the setup cycle as will be described. An example of a point summing cross pattern is shown in FIG. 4. If the temperature point 23 being analyzed and the selected target size are two, then an average value of the temperature points 23-23h is determined using Equation 1 below. Equation 1 is a general mathematical expression or algorithm for determining an average temperature in the first cross pattern, and its result is used as a hole area temperature baseline.

$$\overline{\text{hole}} = \frac{\sum_{i=n-\frac{t_s}{2}}^{i=n+\frac{t_s}{2}} X_i Y_n + \sum_{i=n-\frac{t_s}{2}}^{i=n+\frac{t_s}{2}} X_n Y_i}{2t_s + 2}$$ (Eq. 1)

Where $t_s$ = target size setting $n$ = temperature array index

Next, as further shown in FIG. 4, X-Y temperature points in a second cross pattern beyond the first cross pattern are used in a similar fashion to determine temperature baseline of the surrounding skin area 79. The skin area region represented by a second cross pattern size is also defined by a target size setting of even numbers in a range of about 2-20 points. Continuing with the above example in FIG. 4, for the temperature point 23, if the selected target size is two, then an average value of the temperature points 25a-25h is determined using Equation 2 below. Equation 2 is a general mathematical expression or algorithm for determining an average temperature in the second cross pattern beyond the first cross pattern, and its result is used as a skin area temperature baseline.

$$\overline{\text{skin}} = \frac{\sum_{i=n-t_s}^{i=n-\frac{t_s}{2}-1} X_i Y_n + \sum_{i=n+\frac{t_s}{2}+1}^{i=n+t_s} X_i Y_n + \sum_{i=n-t_s}^{i=n-\frac{t_s}{2}-1} X_n Y_i + \sum_{i=n+\frac{t_s}{2}+1}^{i=n+t_s} X_n Y_i}{2t_s + 2}$$ Eq. 2

Where $t_s$ = target size setting $n$ = temperature array index

Thereafter, a difference between the average skin and hole temperatures is determined using Equation 3 a below and compared to a selectable threshold setting in a range of about 0.01-10.

$$\Delta\text{temp} = \overline{\text{skin}} - \overline{\text{hole}}$$ (Eq. 3a)

If the temperature difference between the average skin and hole temperatures is determined to be less than a selected temperature threshold or reference value, then the Xn-Yn temperature point being analyzed is considered not to be significant. In the example of FIG. 4, if the temperature difference using the temperature point 23 is less than the temperature threshold, the temperature point 23 is not considered to be associated with a blade feature 22. The process then repeats the above analysis with the next X-Y temperature point in the X-Y temperature grid.

However, if the average skin and hole temperatures of any X-Y temperature point is greater than the temperature threshold, that X-Y temperature point is considered to represent a temperature point associated with a feature and is stored in the memory 78 as a significant point in an array of significant points. The above process is repeated for all of the points in the region of interest, and the output of this algorithm is an array of significant points. The temperature threshold or reference temperature is determined during the setup process.

The control 48 is operable, at 308, to identify the various features by detecting all significant points that share a common border. If a significant point is bordered by another significant point, these points are grouped to form a detected feature. The algorithm used for detection is an eight cell test as shown in FIG. 5. For a selected significant point, each of the coordinates for the eight bordering points is tested for its existence in the array of significant points. Bordering points that are found are deleted from the significant point array and stored along with an associated center point as a detected feature in a feature array in the memory 78. This process continues until no further bordering points are found. Thus, each feature identified in the feature array is defined by a center point and eight bordering points. The control 48 repeats the above process until all significant points have been tested.

The center coordinates of each detected feature are determined by the control 48, at 310, using Equations 4 and 5 below. The X center point determined by Equation 4 and the Y center point determined by Equation 5 are each found by dividing a sum of all respective axis points by an area value and adding one as a bias. This area value, A, is used for classification of the feature.

$$X_{center} = \frac{\sum X}{A} + 1 \quad \text{(Eq. 4)}$$

$$Y_{center} = \frac{\sum Y}{A} + 1 \quad \text{(Eq. 5)}$$

Next, the control 48 determines, at 312, a classification or qualitative characteristic of a detected feature using Equations 6 and 7 below. First, with Equation 6, a comparison of the detected feature area, A, is made with a stored selected partial limit size. If a feature area is greater than or equal to a selected partial limit size, which is in a range of about 1-50 points, the feature is classified as a through hole 82 shown in FIG. 6A; however, if the feature area is less than the partial limit size, the feature is classified as a partially blocked hole 84. The partial limit size is selected during the setup cycle. Using Equation 7, blocked holes 80 are determined by calculating a difference between an expected number of holes and a total number of holes detected. Extra holes are indicated to by a negative result of Equation 7.

$$A = \Sigma \text{feature\_points} \quad \text{(Eq. 6)}$$

$$E = \text{expected\_features} - \text{no\_features\_found} \quad \text{(Eq. 7)}$$

Thereafter, the control 48, at 314, determines whether all detected features in the feature array have been classified. If not, the classification process described above is repeated until all features in the feature array have been classified. Next, the control 48 determines, at 316, whether the current position and orientation of the IR camera is the last position and orientation. If not, the process of FIG. 3 is repeated until the IR camera 50 has been moved to all of the positions and orientations stored in the memory 78 and thus inspecting and classifying all of the blade features 22.

In order to establish desired positions and orientations for the IR camera 50 and determine values for many of the parameters used in executing the inspection cycle program 92 of FIG. 3, a setup cycle process is executed. In a first step of the setup cycle, the robotic arm 46 is moved to various preliminary positions around the blade 20 by an operator providing input commands to the control 48. At each preliminary position, an IR setup image is taken and stored in the computer 48; and a sufficient number of preliminary positions are chosen, so that all of the blade features 22 to be inspected are in one or more setup images. Further, to provide the most reliable feature discrimination, at each of the preliminary positions, the IR camera 50 is oriented such that the centerline of the lens 51 is generally parallel to a centerline of the features or holes 22 to be inspected. However, the feature inspection systems and processes described herein are operable with other IR camera orientations.

Next, for convenience, often the setup images are transferred to a computer remote from the control 48 of the inspection system 38 in order to finish the setup process. Such a remote computer is loaded with the inspection cycle program of FIG. 3 and is able to operate the inspection cycle program in a simulation mode. Further, the user is able to create a display of each of the setup images using a known program that converts the X-Y temperature point grid pattern of each image to a color or gray scale. Upon viewing each image, the user determines which, if any, features are best shown in that image. In that viewing process, the inspection cycle program of FIG. 3 is executed using default values for setup selectable parameters, for example, the target size setting, the temperature array index, the temperature threshold, the partial limit size and other parameters.

The user is able to change the values of those parameters and observe how the result of the inspection cycle program changes in terms of being able to better discriminate, identify and classify one or more features of interest. The results of the inspection cycle program are displayed to the user in a manner similar to the view shown in FIG. 6A. Thus, for example, during the simulation, the user can increase the target size setting to see if that impacts the resulting discrimination and classification. Further, the gas temperatures can be changed to increase the resulting temperature difference determined in Equation 3. Often the larger the temperature difference the better the discrimination and the faster the feature inspection process can be executed. However, gas temperatures that are too high or too low will affect feature discrimination, so there must a balance struck between a temperature difference and the gas temperatures.

If the user is not satisfied with the result of the simulation of the inspection cycle program, the setup image can be deleted; and the next setup image viewed. If the user is satisfied with the resulting feature classification of the inspection cycle program simulation, the user places a boundary around one or more of the features being observed, for example, the region of interest boundary 86 of FIG. 6A. That boundary represents a region of interest in a setup image taken at a particular preliminary position and orientation. In any setup image, the user can create as many boundaries or regions of interest as there are holes; and each region of interest can include one or more holes or rows of holes. Further, that particular preliminary position and orientation is defined as a programmed position and orientation that are to be used during subsequent executions of the inspection cycle program either in a simulation mode or during a part inspection cycle or process.

The above process is repeated until all of the features 22 on the blade 20 have been inspected in a region of interest. If some features cannot be adequately defined, then more setup images must be taken; and the above process repeated for those features. At this point, the inspection cycle program 92 includes (1) all of the positions and orientations of the IR camera 50 that are necessary to inspect the desired blade features 22, (2) all of the regions of interest 86 for a position and orientation, wherein each region of interest defines one or more of the blade features, and (3) values for all of the selectable parameters, for example, the target size setting, the temperature array index, the temperature threshold, the partial limit size and other parameters, which have been determined to provide the best feature discrimination. The inspection cycle program is then transferred to the control memory 78, and an inspection cycle can be executed.

A pre-inspection cycle is used to normalize the temperature of the blade 20. In the pre-inspection cycle, the control 48 opens the valves 64, 52 to initiate flows of air and helium. Temperature feedback signals from the temperature sensors 70, 58 are used by the control 48 to operate the respective heater 68 and chiller 56 to bring the air and helium to a desired temperature. Further, the flows of cooled helium through the blade 20 and heated air over the blade skin 79 for a period of time, for example, 1-30 seconds, normalizes the temperature of the blade, that is, the blade temperature reaches a sufficiently stable value to permit execution of the inspection process.

During the pre-inspection cycle, the control 48 also operates the pressure regulators 72 and 60 to establish desired pressures for the heated air and chilled helium respectively. The desired pressures are chosen during the setup cycle to optimize a discrimination and classification of features in the IR image during the inspection process. For example, if the air is too cold or the helium is too hot, feature discrimination and classification will be adversely affected. Further, once desired pressures of the air and helium are established that provide an acceptable feature discrimination and classification, changes in the ambient pressure around the blade 20 will adversely affect the feature discrimination and classification process. Therefore, during the pre-inspection cycle, a pressure sensor 90 provides the control 48 with a pressure signal representing the ambient pressure around the blade 20. The control 48 then sets the desired air and helium pressures as respective multiple values of the ambient air pressure to establish a desired ratio of air and helium pressures. Further, as the ambient pressure changes during subsequent executions of the feature inspection program, the control 48 changes the respective multiple values to maintain the desired air and helium pressures in constant relationship with respect to the ambient air pressure. To determine the desired air and helium pressures, the robotic arm can be moved to different inspection programmed positions; and the IR camera images viewed. The air and helium pressures are then adjusted to change the gas flows until an IR image of the desired quality is obtained.

Figure 7:
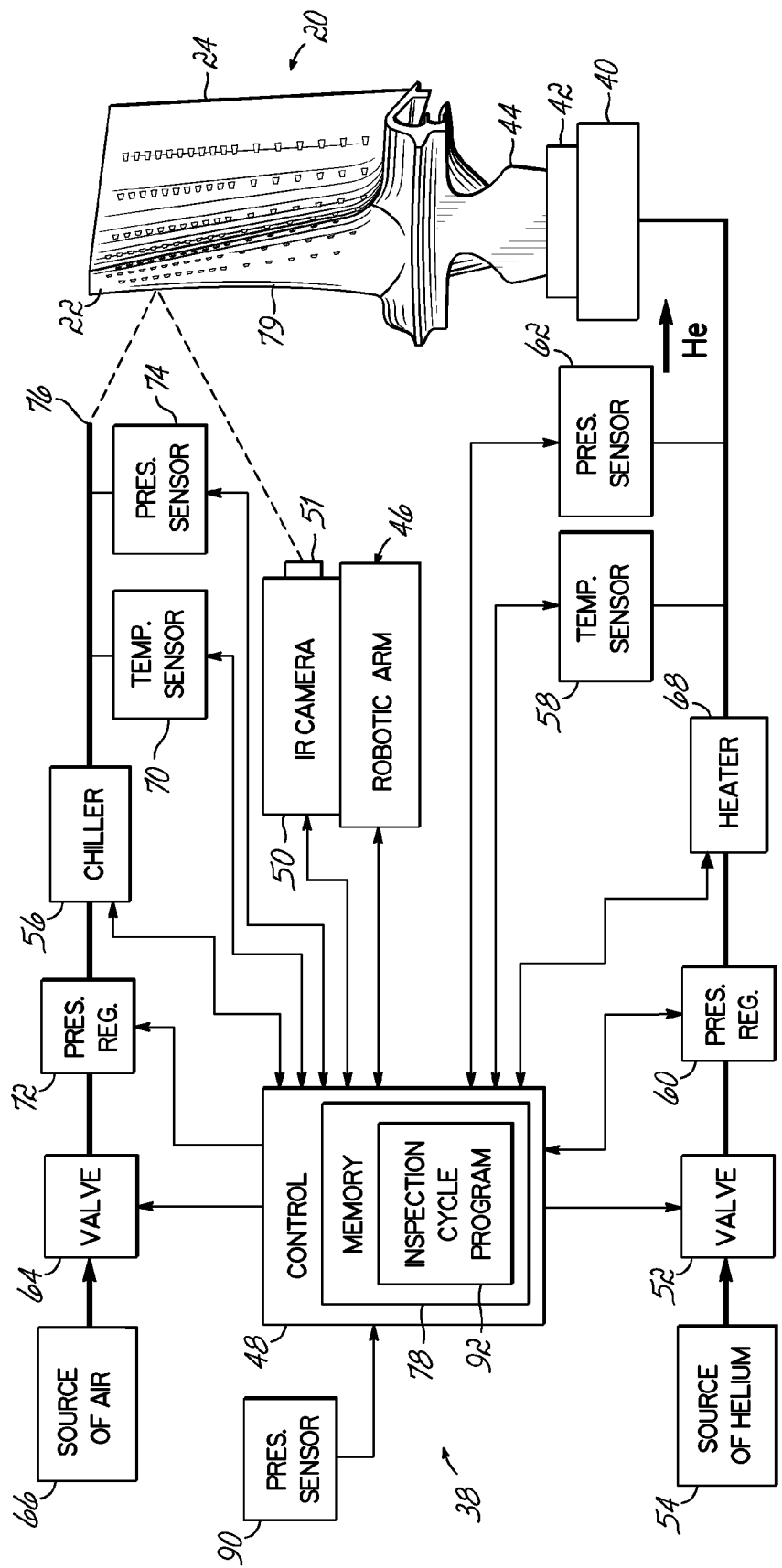
FIG. 7 is an overall schematic diagram of another exemplary embodiment of the automated inspection system of FIG. 1.

In an alternative exemplary embodiment shown in FIG. 7, an alternative, second data acquisition method of the feature inspection cycle is provided by inverting the locations of the chiller 56 and the heater 68. With this embodiment, the control 48 operates the first pressure regulator 72 to supply air to the chiller 56 at a pressure in a range of about 0.05-3.0 PSIG. The chiller 56 cools the air to a temperature in a range of about 25-70 degrees. This cold air is applied through the nozzle 76 to an outer surface of the blade 20 around the various features being supplied the heated helium. At the same time, the control 48 operates the second pressure regulator 60 to supply the helium gas 54 to the heater 68 at a pressure in a range of about 0.1-35 PSIG. The heater 68 heats the helium gas to a temperature in a range of about 70-150 degrees, and the heated helium is applied to an interior cavity through an opening at the base 44 of the blade 20 and allowed to escape through the various features 22 to be inspected. After a period of time, the IR camera 50 is triggered to capture a temperature image; and the process previously described with respect to FIG. 3 is repeated to identify and classify various features. However, it should be noted that with this second data acquisition method, a second data analysis method is used. An exemplary embodiment of the second data analysis method is identical to the first data analysis method except that for the significant test, instead of using Equation 3a, an Equation 3b is used, which is set forth below:

$$\Delta temp = \overline{hole} - \overline{skin}, \quad (Eq. 3b)$$

The feature inspection systems 38 of FIGS. 1, 2 and 7 and method of FIG. 3 are substantially automated, faster, more error-free and less expensive than known tactile and visual inspection methods. The feature inspection systems 38 of FIGS. 1, 2 and 7 inject a gas through the internal passages of the blade 20, which is less dense and lighter than ambient air, for example, helium. The lighter gas provides a more predictable and reliable gas flow through the small passages within the blade 20 and out the complex shaped features 22 that exit on the blade skin 79. Further, the feature inspection systems 38 of FIGS. 1, 2 and 7 provide a simultaneous heating of one gas, for example, air, and cooling of the other gas, for example, helium. The simultaneous heating and cooling improves the capability of the feature inspection systems 38 to discriminate and classify features using the process described with respect to FIG. 3. In addition, the feature inspection systems of FIGS. 1, 2 and 7 continuously regulate the pressures of the gas with respect to ambient air pressure around the blade 20. Such a pressure regulation further improves the capability of the feature inspection systems 38 to discriminate and classify the blade features 22. Thus, the feature inspection systems 38 are especially useful for inspecting a large number of complex fabricated features, for example, cooling holes, in gas turbine component.

An exemplary embodiment of an alternative, third data acquisition method uses a programmed delay between the application of the downstream air and upstream air. In practice, the IR camera 50 (FIG. 2) is moved to a desired position and orientation with respect to a feature 22 of the blade 20. The control 48 commands the downstream valve 64 to open, which flows heated gas or air over the surface 79. After a first programmed period of time sufficient to allow the skin temperature of the surface 79 to stabilize, the control 48 commands the upstream valve 52 to open. This ports chilled helium through the base 44 of the blade 20 and out the features 22. After a second programmed period of time, the IR camera is triggered; and a first, single raw IR image is captured. This raw image is stored in the control's memory at 302 of FIG. 3. The control 48 commands the upstream valve 52 to close. The disclosed first data analysis method of steps 304-314 of FIG. 3 is executed, and the IR camera 50 is then moved to the next programmed position. With a continuous flow of downstream heated air, the above sequence of events is repeated to apply bursts of upstream chilled helium until all programmed positions have been cycled.

An exemplary embodiment of a variation of the third data acquisition method adds a third programmed period of time that starts after the acquisition of the first, single raw IR image. Upon expiration of this third time period, a second, single raw IR image is captured and stored. Thereafter, the control 48 commands the upstream valve 52 to close. An alternative, third data analysis method is then used with this variation of the third data acquisition method. Analysis of the dual IR image is performed by first creating a difference temperature X-Y array or grid in which the temperature of each array element is created by subtracting a temperature array element in the first raw IR image from a corresponding temperature array element in the second raw IR image. The resulting temperature difference array is then analyzed using steps 304 through 314 of FIG. 3 with the significant test using Equation 3b. This dual raw IR image cycle is repeated for all other programmed positions.

An alternative fourth data acquisition method may optionally use infrared ("IR") emitters 110 to heat the surface 79 of the blade 20 via thermal radiation. The thermal radiation may be applied either with, or without, heating by thermal convection using the downstream hot air. Referring to FIG. 8, with this embodiment, a group of infrared ("IR") emitters 110 and hot air nozzles 112 are mounted around the IR camera lens 51 in place of the nozzle ring 94 shown in FIG. 2A. The exemplary embodiment has the IR emitters 110 mounted at 45 degrees. The air nozzles 112 are mounted on a bisecting angle between the infrared emitters. Use of the emitters is most effective when the emissivity of the skin is low, that is, more reflective. In one embodiment, the emitters 110 may be IR-12K emitters commercially available from Boston Electronics Corporation of Brookline Mass. Each emitter 110 is mounted inside a PI-224 elliptical reflector with a calcium fluoride window, also available from Boston Electronics.

FIG. 9 illustrates another embodiment of the feature or hole inspection system 38 that is utilized with the fourth data acquisition method. In this embodiment, the components that have identical numbers as the components in FIGS. 2 and 7 are substantially similar thereto. The control 48 has a plurality of controllers 120-128 that may be embodied in programmable hardware and/or software. The controllers 120-128 may be embodied in separate programmable processors, or one or more of the controller functions may be included in a single programmable processor. A particular embodiment of the controllers 120-128 is a matter of design choice. The operation of the controllers 120-124 is coordinated by a main controller 126 that communicates with the other controllers via a network 130, for example, an ethernet. The main controller 126 also communicates with one or more user interfaces 138. A user interface 138 often has a monitor 140, a touch screen 142, a mouse 144, a keyboard 146 and a bar code reader 148. The user interface 138 may have multiple monitors and touch screens as well as the other user interface components.

A part clamp controller 128 has a separate user interface and is capable of independent operation. The part clamp controller 128 is operative in response to user commands to clamp the part 20 in the adapter plate 132. The proper loading of the part 20 with respect to the adapter plate 132 is checked by a part loaded sensor 134 and adaptor loaded sensor 136, respectively. The states of the sensors 134,136 are detected by the robot safety controller 122 and communicated to the main controller 126 via an interface controller 124. The interface controller 124, in response to the main controller 126, provides, in a known manner, analog and digital command signals to, and receives analog and digital feedback signals from, devices in the inspection system 38.

In response to commands from the main controller 126, the robot motion controller 120 controls, in a known manner, the operation of the robot arm 46 and is operative to position the IR camera 50, which is mounted at the end of the robot arm, at desired positions and orientations with respect to the part 20. Once the IR camera 50 is in position, the main controller 126 may command, via the interface controller 124, a programmable power supply 135 to turn on the IR emitters 110 (FIG. 8) at a desired voltage. An emitter feedback voltage signal is provided on signal line 160 to the interface controller 124. The main controller 126 may also provide, via the interface controller 124, a command voltage on signal line 150 to operate a downstream airflow controller 152, which is operative to supply a desired flow of air from a source 66 to a heater 68. The downstream airflow controller 152 maintains the desired flow of air by regulating the air pressure. The main controller 126 also controls, via the interface controller 124, the operation of the heater 68 and the three-way valve 156 to port the heated, pressure regulated air flow through the hot air nozzles 112 (FIG. 8).

The main controller 126 may also provide, via the interface controller 124, a command voltage on signal line 164 to operate an upstream airflow controller 166, which is operative to supply a desired flow of air or helium from a source 162 to a chiller 56. Again, if the source 162 is air, it is clean air, for example, air with an air dew point no greater than +30 F., no particulate size greater than 1 micron and an oil content less than 10 PPM weights. The upstream airflow controller 166 maintains the desired flow by regulating the pressure. The main controller 126 also controls, via the interface controller 124, the operation of the chiller 56 to port the chilled, pressure regulated flow through the flow fixture 40. An atmospheric air pressure signal and pressure and temperature feedback signals for the chilled flow are provided on signal line 168 from the flow fixture 40 to the main controller 126 via the interface controller 124.

With the fourth data acquisition method, the IR emitters 110 and downstream heated air may be used separately or together. Further, the upstream fluid may be chilled air or helium. The fourth data acquisition method supports any of those combinations, and depending on a part's emissivity, cooling hole pattern and other physical characteristics, a particular combination may provide an optimum feature discrimination. Generally, in a preproduction process, different combinations are tried to see which combination provides the best hole or feature discrimination. The fourth data acquisition method is a further extension of the third data acquisition method in that a sequence of more than two IR images is captured.

Figure 10:
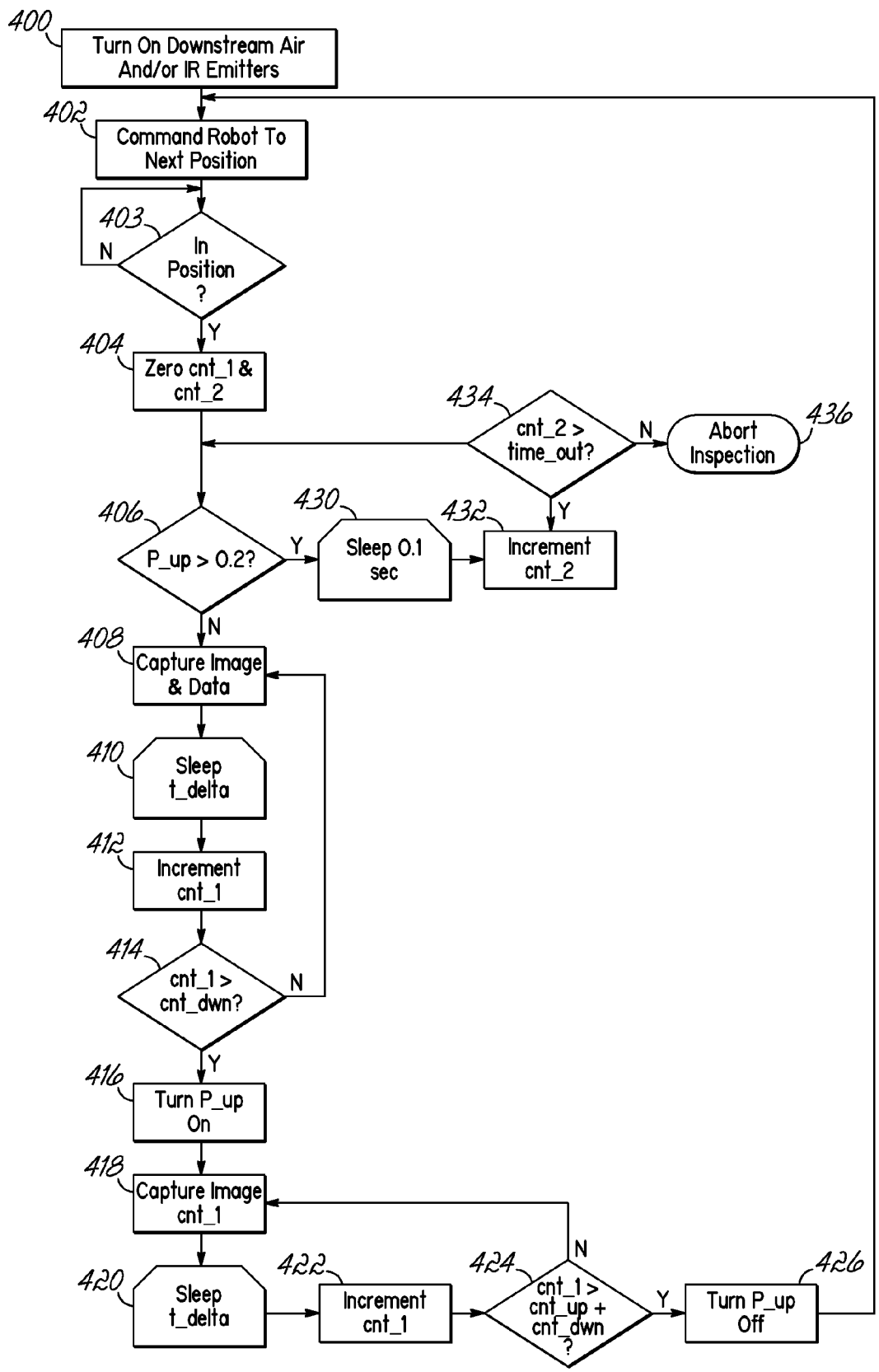
FIG. 10 is a flowchart of an exemplary embodiment of an alternative data acquisition method.

An exemplary embodiment of the fourth data acquisition method is shown in FIG. 10. The control 48 initiates, at 400, a heating of the surface 79 of the blade 20 by activating the IR emitters 110 and/or the valve 64 to initiate a flow heated downstream air through nozzles 112. The control 48 then commands, at 402, the robotic arm 46 to move the IR camera 50 to a first position with respect to one, or a group of, the features. Upon detecting, at 403, that the robotic arm 46 has achieved the commanded position, the control 48 initializes or zeros two counters at 404. Next, the control 48 then checks, at 406, the upstream fluid pressure to determine whether the upstream chilled gas flow is off. If so, the control 48 then captures, at 408, an image from the IR camera 50 and associated data and stores the image and associated data in the control memory 78.

This memory storage takes the form of a binary file. The raw IR data is stored as 76,800 floating-point numbers followed by the test metrics present at the time the IR image was captured. The metrics are stored as predefined structure composed of, for example, the upstream pressure and temperature, the downstream pressure and temperature, the barometric pressure; the IR emitter voltage and the date and time.

The control 48 then executes a dwell or time delay at 410 and then, at 412, increments counter 1. At 414, the control 48 compares the counter 1 value to the time period for the downstream image capture cycle. If the counter 1 value is less than the downstream image capture time period, the control 48 iterates steps 408-414 to capture further images and associated data until the counter 1 value exceeds the downstream image capture period.

Thereafter, the control 48 turns on, at 416, the upstream chilled gas, for example, air or helium and thereafter, at 418, captures and stores an image and associated data in a manner as described above. The control 48 then waits, at 420, for a dwell or time delay; and then increments counter 1. At 424, the control 48 determines whether the counter 1 value is greater than the total of the downstream and the upstream image capture time periods. If not, the control 48 then iterates steps 418-424 to capture more images. When the counter 1 time value exceeds the downstream and upstream image capture time periods, the control 48, at 426, turns off, the upstream chilled gas and commands, at 428, the robotic arm to move the IR camera to the next position.

The IR emitters 110 and/or downstream heated air directed at the blade surface 79 remain continuously on during the fourth data acquisition cycle, and the process of FIG. 10 is repeated to capture images of all of the features 22 on the blade 20. In executing the process of FIG. 10, if the control 48 determines, at 406, that the upstream fluid pressure is too high, it pauses for a period of time as shown by steps 430-434.

If the upstream fluid pressure does not reduce over that period of time, the data acquisition cycle is aborted by the control 48 as indicated at 436.

A fourth data analysis method is executed after data is acquired at each position with the fourth data acquisition method. The fourth data analysis method is different in several respects than the data analysis methods described earlier with respect to FIG. 3. For example, the fourth data analysis method is organized into positions and features or holes. A position is the end point of the robot's movement, which is accurately positioned with respect to a feature or hole of interest ("HOI") and is where the raw IR images are captured. A particular HOI can now be identified as a region. By programming the nominal position of a feature or hole, a nonconforming feature or hole can be more precisely identified. Another advantage of the fourth data analysis method is that the cross-pattern and eight-border algorithms described with respect to FIGS. 3 and 4, respectively, are not required.

Figure 11:
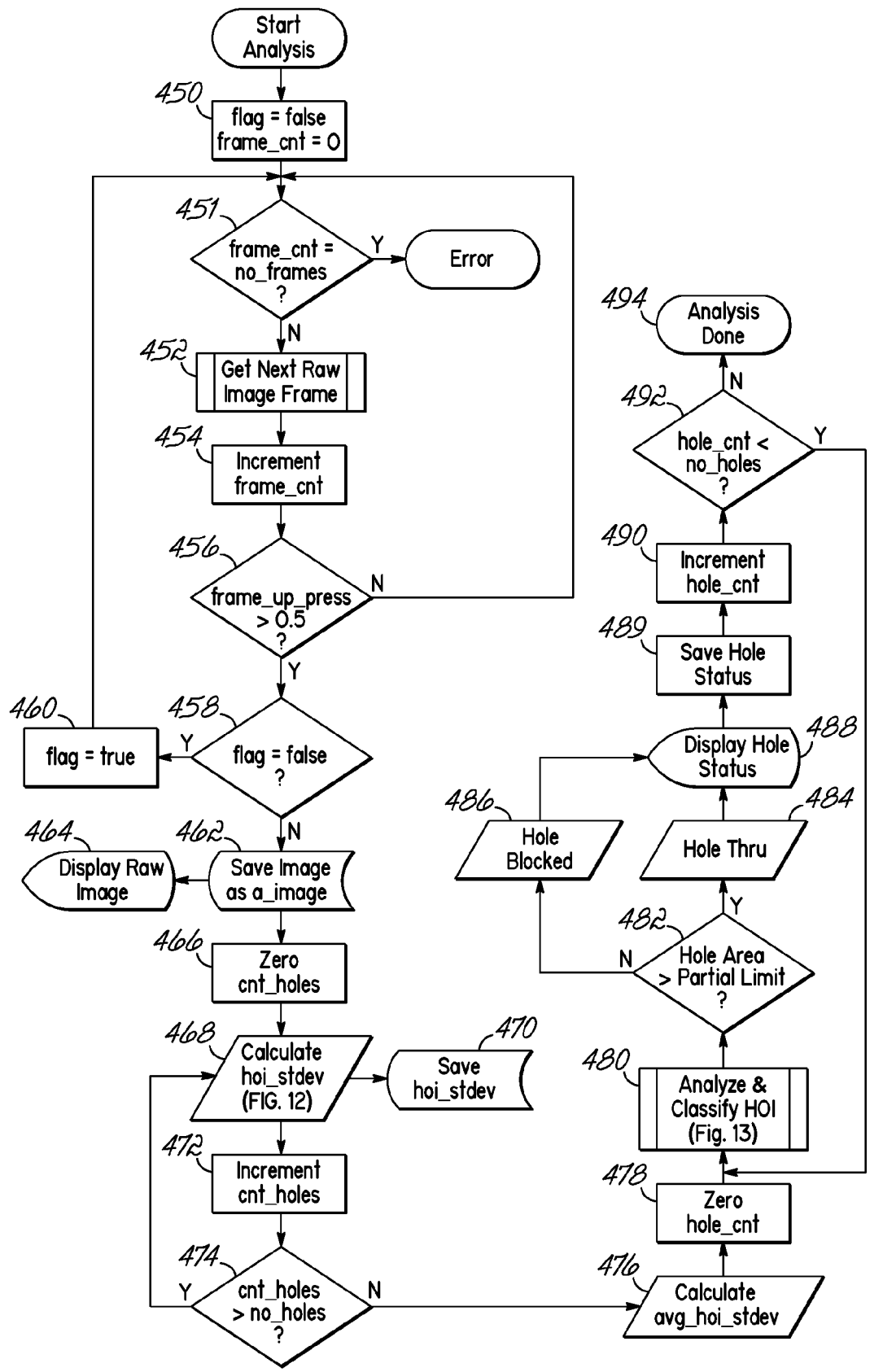
FIG. 11 is a flowchart of an exemplary embodiment of one alternative process for identifying acquired thermal images to be analyzed and determining a status of features within the acquired thermal images.

In the exemplary embodiment of a fourth data analysis method shown in FIG. 11, the control 48 sets, at 450, a flag to a zero or a false state and a frame counter to zero. The fourth data analysis method looks at the second image that was captured after the upstream pressure reaches a predetermined level, for example, 0.5 PSIG. This delay provides more time for the effect of the chilled upstream air to show up in the IR image. In contrast, the effect of the chilled upstream helium shows up more quickly. To find that image, the control, at 451, determines that the current frame count is not equal to the total number of frames available; and thereafter reads the next raw image frame and associated data. The control 48 then, at 454, increments the frame counter, and, at 456, determines from the data whether upstream pressure is active. If not, the control 48 iterates through steps 451-456 until an image is found with associated data indicating that the upstream pressure greater than 0.5 PSIG. Next, a determination is made, at 458, whether the flag is false; and if so, the flag is set true at 460. A subsequent raw image and data is then read at 452, and this is the second image captured after the upstream pressure is activated. The control 48 then saves, at 462, the second image and associated data; and, at 464, the image is displayed, for example, image 170 shown in FIG. 6B.

Figure 12:
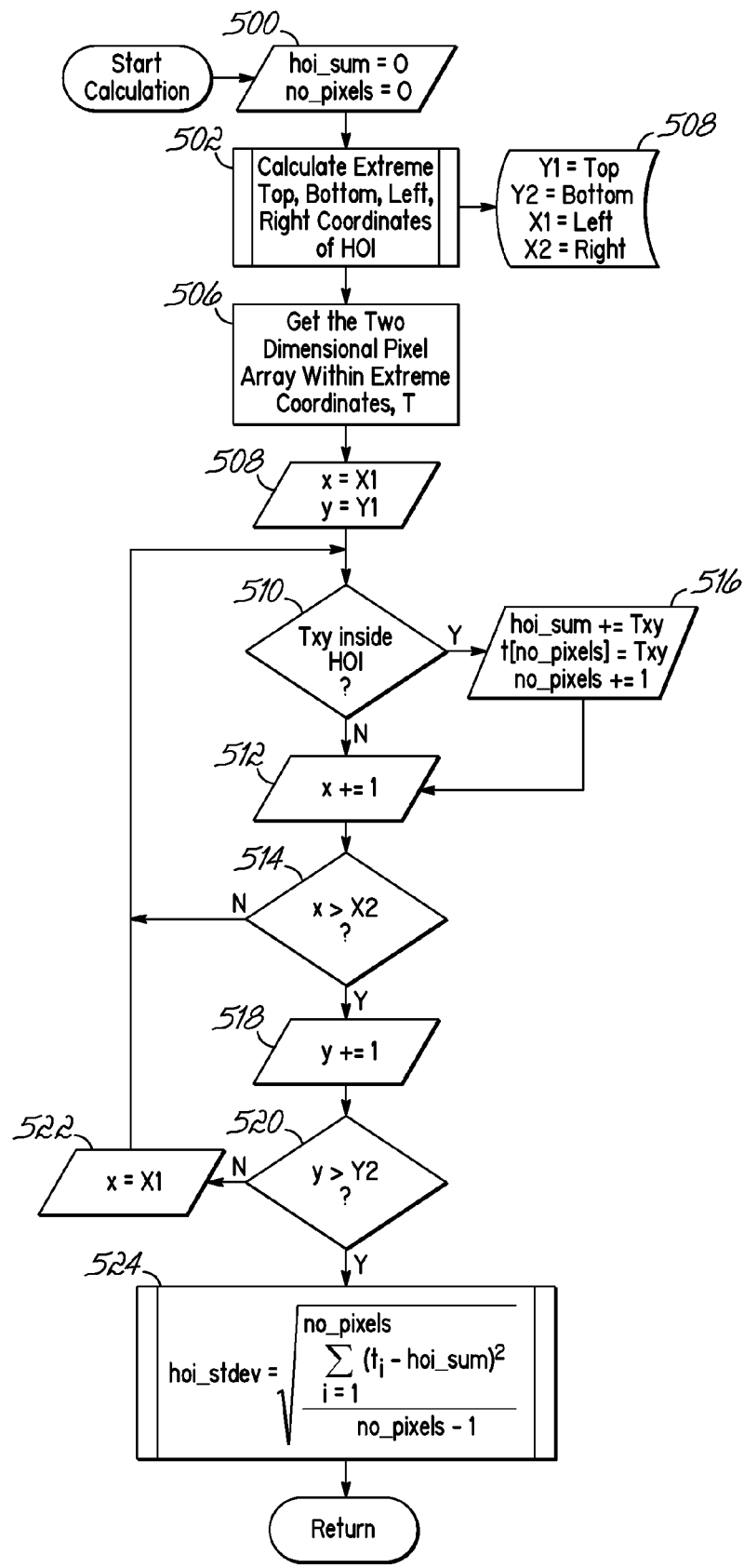
FIG. 12 is a flowchart of an exemplary embodiment of a process for determining a standard deviation of detected temperatures inside a feature of the part being inspected.

The control 48 then, at 466, resets the feature or hole counter to zero, which counts the number of features or holes being analyzed, which, for example, in FIG. 6B is four holes 174. At 468, the control 48 determines a standard deviation of the temperatures detected in the HOI in the saved second IR image. One exemplary embodiment of that process is shown in more detail in FIG. 12. First, at 500, a HOI sum register and pixel number counter are set to zero. As noted earlier, an image is an array or grid of 76,800 floating point temperatures, which has 320 temperatures in the X-axis and 240 temperatures in the Y-axis. Further, the IR image may include several holes, and knowing the position of the end of the robotic arm, the control 48 is able, at 502 and 504, to determine corner coordinates of an area, for example, area 172 of FIG. 6B, which may be slightly larger than, and includes the full area of, a particular HOI. The HOI of interest may be a square, rectangle, parallelogram or other polygon. Next, the control 48 then retrieves, at 506, an area of pixels from the image that are bounded by the corner coordinates.

Thereafter, at 508, the control 48 starts at one x,y corner coordinate and determines, at 510, whether that x,y coordinate is within the HOI; and if not, the control 48 increments, at 512, to the next x-coordinate while holding the same y coordinate. If the next x coordinate is greater than the x corner coordinate as determined at 514, the next x,y coordinate is tested, at 510, as to whether it is inside the HOI. Again, because the control 48 knows the coordinates of the geometry of the HOI with respect to the image being analyzed, the control 48 can determine if the x,y coordinate is inside the HOI. If it is, the control 48 then, at 516, adds the temperature of that x,y coordinate to the HOI sum register. The temperature of that x,y coordinate is stored, and the pixel number counter is incremented by one. This process of steps 510-516 is repeated for each x coordinate along the first y coordinate until the next x corner coordinate is detected at 514.

The y coordinate is incremented, at 518, to the next row in the grid. A test, at 520, determines whether the new y coordinate is a y corner coordinate; and if not, the x coordinate is reset at 522. The process of steps 510-522 is repeated until every point within the area of the corner coordinates is tested as to whether it is inside the HOI. At the end of the process, the HOI sum register has a sum of all of the temperatures inside the HOI; and the temperature of each pixel inside the HOI is stored. Also, the pixel counter has a count of the number of pixels inside the HOI. With the above process, the control 48 is able to quickly limit the number of image pixels to be analyzed to only those inside a particular HOI within the stored second image. Thereafter, the control 48 determines, at 524, the standard deviation of the temperatures within the HOI.

Returning to FIG. 11, the standard deviation of the HOI is saved at 470. In this embodiment, only the standard deviation (hoi_stdev) is necessary to be calculated for each temperature point inside the HOI. However, in practice, the average temperature and its maximum and minimum are often also determined. The control 48 then increments, at 472, the hole counter and, at 474, determines whether the hole counter is less than the total number of holes. If so, steps 468-474 are repeated for other holes within the stored second image. After the standard deviations for all of the holes have been determined, the control 48 determines, at 476, an average of the standard deviations and, at 478, the hole counter is reset to zero.

The control 48 then, at 480, analyses temperatures and classifies each HOI. One exemplary embodiment of that process is shown in more detail in FIG. 13. First, the control 48 determines, at 550, a threshold value. In this embodiment, the value of k is 0.25. Thereafter, the control 48 proceeds to execute steps 552-564, which are substantially similar to the process of steps 502-514 shown and described with respect to FIG. 12. First, x,y corner coordinates of an area that is slightly larger than, but includes the full area of, a particular HOI are determined; and an area of pixels is retrieved from the image that are within an area bounded by the x,y corner coordinates. The control 48 then tests, at 560, whether a pixel is within the HOI. If it is, at 566, the temperature of that pixel is saved; and a pixel counter is incremented. The control 48 then determines, at 565, whether the saved pixel temperature is greater than a current HOI minimum temperature. If not, the saved pixel temperature is set, at 567, as the current HOI minimum temperature. The control 48 then increments to analyze the next pixel, and the process of steps 560-572 continues in a manner similar to that previously described with respect to process steps 510-522 of FIG. 12. After all of the pixels have been analyzed, all of the temperatures inside the HOI have been saved; the number of pixels inside the HOI is stored in the pixel counter; and the minimum temperature within the HOI is known. It should be noted that the exemplary embodiments in FIGS. 11 and 12 may have some redundancies that may be eliminated in other embodiments.

The control 48 then resets, at 574, a counter that counts the number of pixels inside the HOI. Then, the control 48 determines, at 576, whether a saved pixel temperature is greater than the sum of the threshold value plus the minimum temperature. It should be remembered that the image was captured using data acquisition method 4, that is, after the upstream chilled air was turned on. Therefore, temperatures measured in a good hole should be lower than surrounding temperatures. If the saved pixel temperature is less than the sum of the threshold value plus the minimum temperature, the control 48 sets, at 578, a pixel state as true identifying it as a significant point located in the HOI and further, increments a hole area counter by one. If the saved pixel temperature is greater than the sum of the threshold value plus the minimum temperature, that means the chilled upstream air is not getting through; and the pixel state is set, at 580, to false, indicating that the pixel represents hot skin or a blocked hole and not a through hole. The control 48 then increments, at 582, the saved pixel counter by one; and if counter value is, at 584, less than the saved number of pixels, the process steps 576-584 are repeated for each of the saved pixels. At the end of this process, all of the significant points and a hole area for a current HOI have been identified.

Returning to FIG. 11, the significant points for the HOI are classified into a through hole or a blocked hole. The control 48 compares, at 482, the area of the HOI to a partial limit. If the area is greater than the partial limit, the control 48 identifies, at 484, the HOI as a through hole, for example, referring to FIG. 6B, holes 180 are through holes. If the area is not greater than the partial limit, the HOI is identified, at 486, as a blocked hole. Referring to FIG. 6B, hole 176 is a fully blocked hole; and hole 178 is a partially blocked hole and thus, not a through hole. The hole status is displayed at 488 and saved to memory at 489. The hole counter is incremented at 490 and compared to the total number of holes at 492. If hole counter value is less than the total number of holes, the steps 480-492 are repeated for each hole in the stored second image until the fourth data analysis method is completed as indicated at 494.

An exemplary embodiment of a fifth data analysis method is substantially similar to the fourth data analysis method of FIG. 11 with one exception. Referring to the analyze and classify HOI step 480 of FIG. 11, in the calculation of the threshold in step 550 of FIG. 13, with the fourth data analysis method, n is equal to the number of holes or features. However, in the fifth data analysis method, in the calculation of the threshold in step 550 of FIG. 13, n is equal to the total number of pixels inside all of the holes 174 (FIG. 6B) within the current image 170.

A sixth data analysis method is similar to the fourth data analysis method except two IR images are analyzed just after the upstream air pressure is detected. The first image is labeled the "b_image", and the second image is labeled the "a_image". In an exemplary embodiment of the sixth data analysis method shown in FIG. 14, the control 48 executes steps 650-656 in a manner similar to that previously described with respect to steps 450-456 of FIG. 11. Upon the control 48 determining, at 656, that the upstream pressure is greater than 0.5 PSIG, the false flag is set true at 660; and, at 661, the current image and associated data are saved as b_image. The control again iterates the process of steps 650-656; and upon detecting the true flag at 658, the control 48 then saves the current image and associated data as the a_image. In other words, the b_image and the a_image are the first two IR images after the upstream pressure has been detected.

The control 48 then, at 666, zeros the hole counter; and the standard deviation of the a_image HOI is determined at 668 and saved at 670. The exemplary embodiment of calculating a HOI standard deviation previously shown and described with respect to FIG. 12 may be used. The hole counter is incremented at 672; and if there are other holes in the a_image to analyze as determined at 674, the process of steps 666-674 is repeated for each of the holes in the a_image. In a similar manner, by iterating process steps 667-675, a HOI standard deviation for each of the holes in the b-image is determined at 669 and stored at 671.

Figure 13:
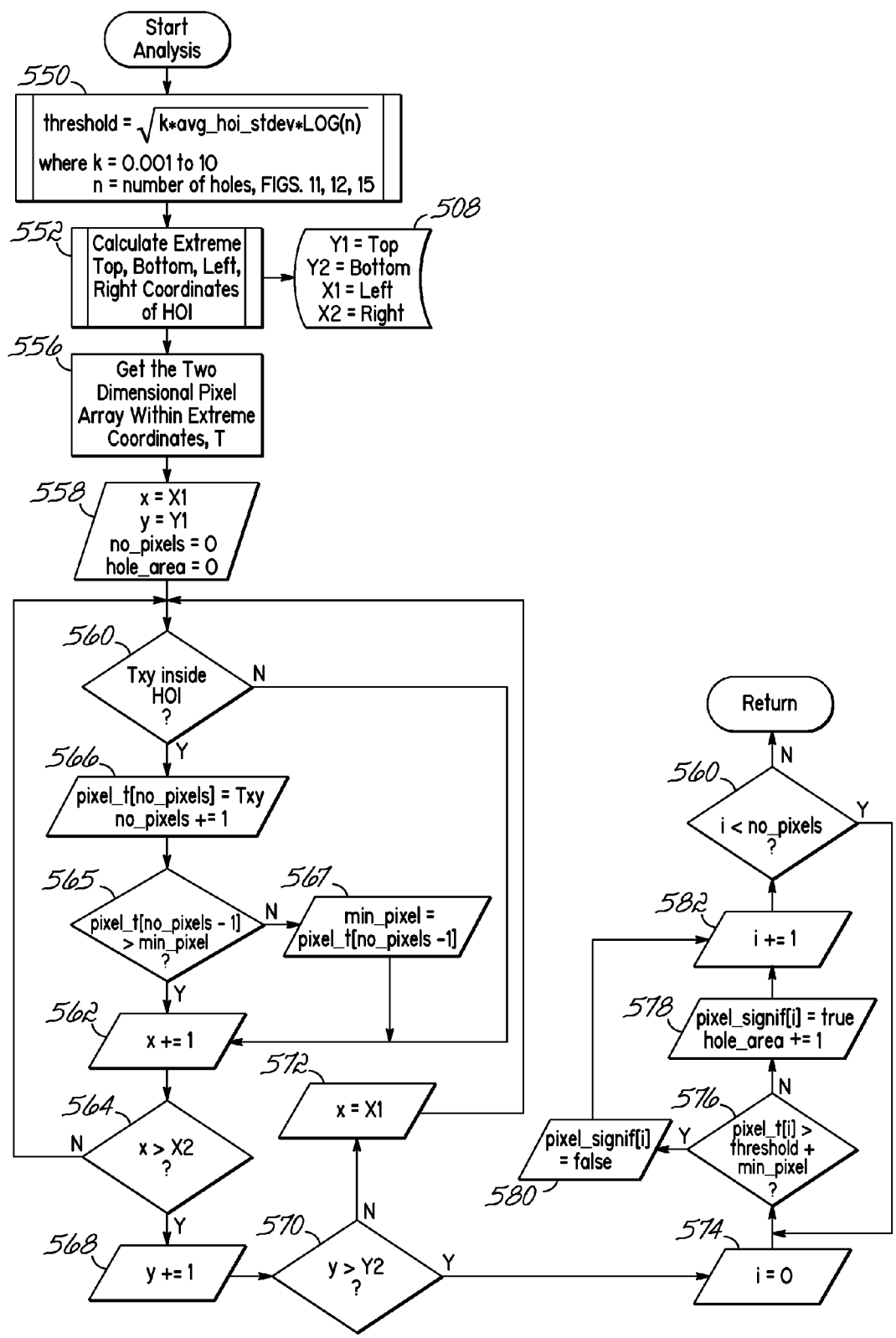
FIG. 13 is a flowchart of an exemplary embodiment of a process for analyzing temperatures detected in a feature of the part being inspected.

Thereafter, the control 48 calculates, at 676, an average of the HOI standard deviations for all of the holes in the a_image; and the hole counter is zeroed at 678. The control 48 then performs, at 679, a HOI analysis for the current HOI in the b_image. The exemplary embodiment of a HOI analysis shown in FIG. 13 may be used; however, for this analysis the threshold as determined at 550 of FIG. 13 is simply equal to the b_image HOI standard deviation determined at 669 of FIG. 14. The remainder of the HOI analysis of FIG. 13 is substantially the same as previously described, so that when completed, a number of significant points or cold points within the HOI will be identified as will the total number of pixels in the HOI. Therefore, the difference between the number of significant points and the total number of pixels in the HOI may be determined and identified as the number of nonsignificant points or skin points.

Figure 14:
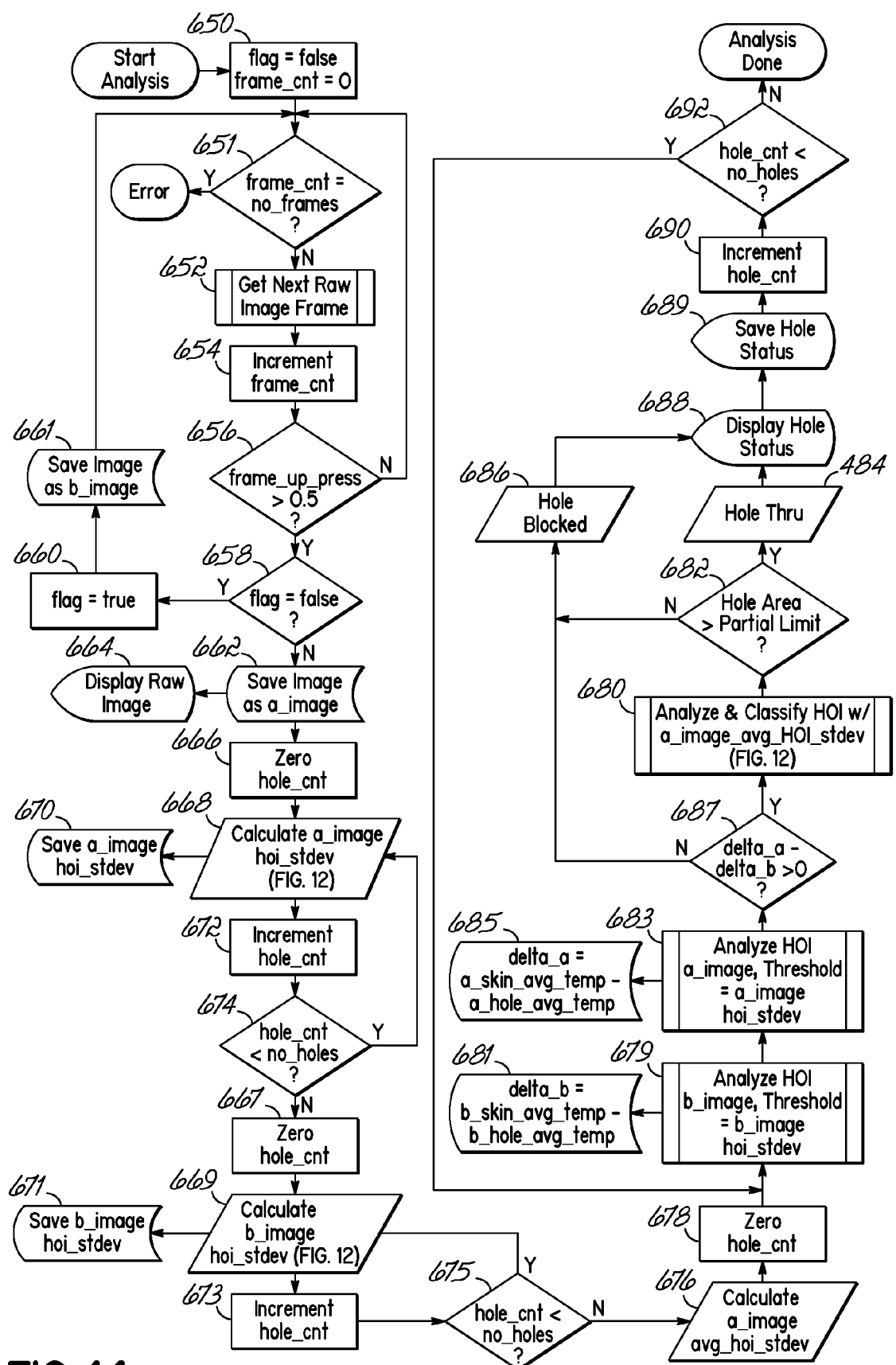
FIG. 14 is a flowchart of an exemplary embodiment of a further alternative process for identifying acquired thermal images to be analyzed and determining a status of features within the acquired thermal images.

The control 48 then determines a delta_b, at 681 of FIG. 14, which is a difference between an average temperature of all of the significant points and an average temperature of all of the skin points for the current HOI in the b_image. In a similar manner, the control 48 performs, at 683, a HOI analysis for the current HOI in the a_image and calculates a delta_a at 685, which is a difference between an average temperature of all of the significant points and an average temperature of all of the skin points for the current HOI in the a_image.

The control 48 then, at 687, subtracts the delta_a temperature from the delta_b temperature. Since the delta_a temperature image was taken later than the delta_b temperature image after the application of the chilled upstream air, a lower delta_a temperature should indicate a presence of a hole. In that event, the control 48 performs, at 680, a HOI analysis that is substantially identical to the HOI analysis that was previously described with respect to FIG. 13. The result is a number of significant points in a current HOI that represents an area of the HOI. If the control 48 determines, at 682, that the current HOI area is greater than a partial limit, the current HOI is identified, at 684, as a through hole.

However, if at 682, the current HOI area is determined not to be greater than a partial limit, the current HOI is identified, at 686, as a blocked hole. Referring back to process step 687, a delta_a temperature that is higher than the delta_b temperature indicates that the flow of chilled air is not detected and that there is no hole. Therefore, the current HOI is identified, at 686, as a blocked hole. The control 48 displays, at 688, the status of the current HOI, saves the hole status at 689, and increments, at 690, the hole counter. If the hole counter is determined, at 692, to be less than the number of holes, the process of steps 679-692 is repeated for each of the holes in the a_image and the b_image.

Figure 15:
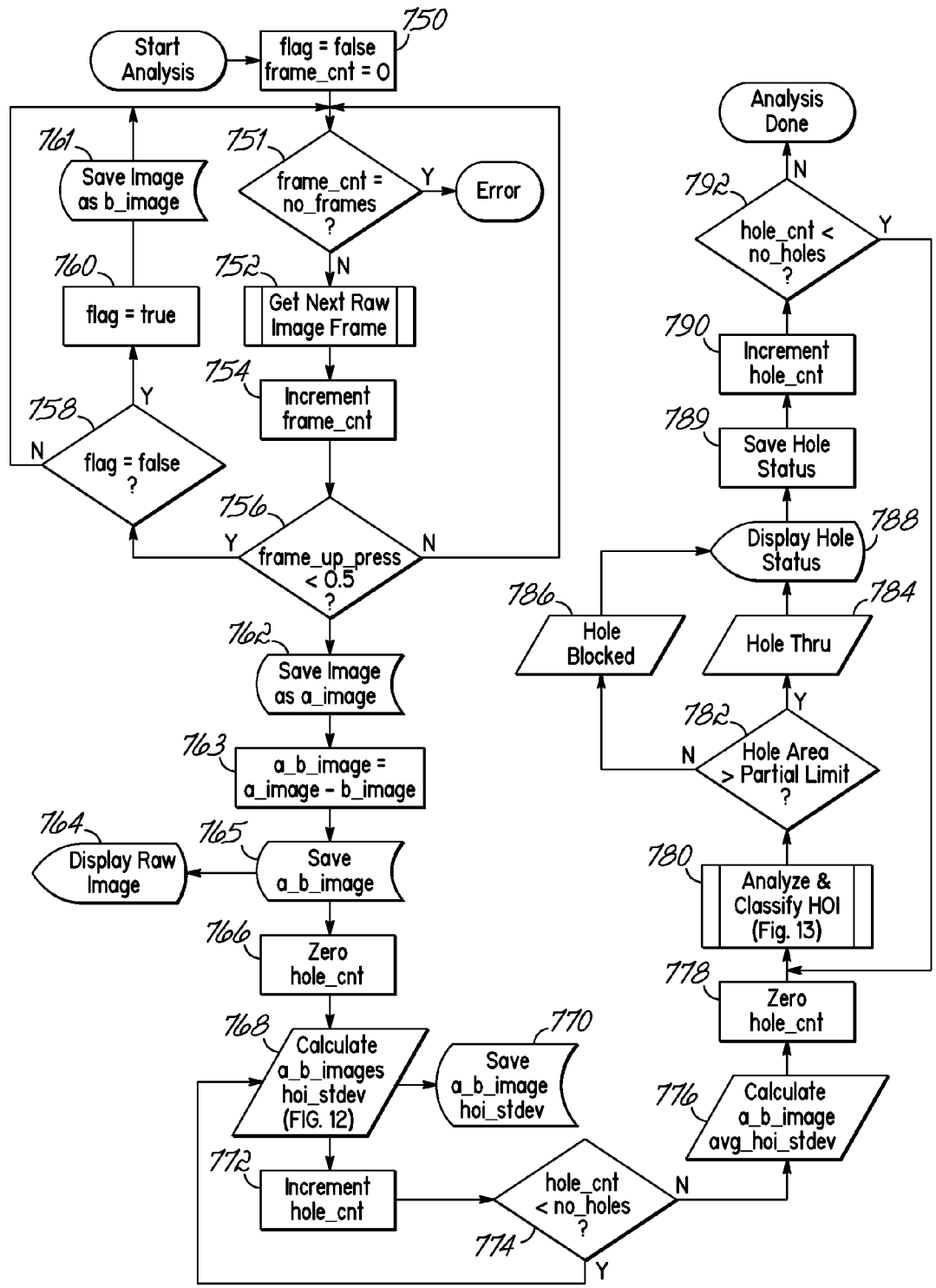
FIG. 15 is a flowchart of an exemplary embodiment of yet another alternative process for identifying acquired thermal images to be analyzed and determining a status of features within the acquired thermal images.
Figure 16:
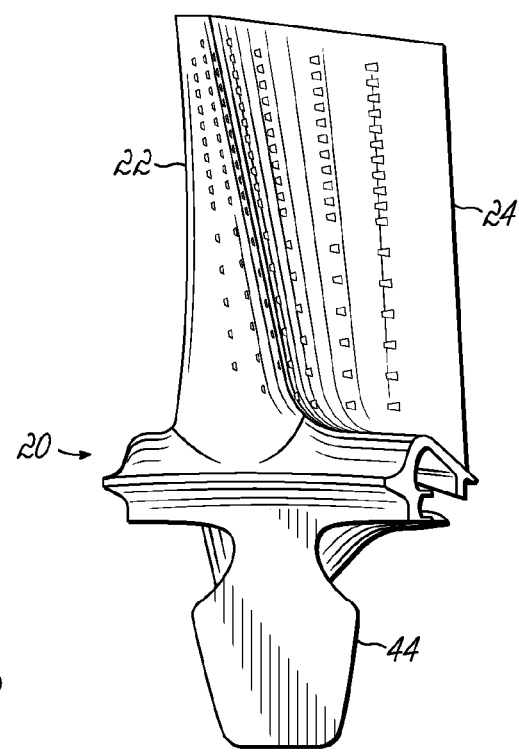
FIG. 16 is a partial perspective view of an example of a known turbine component that utilizes rows of features or cooling holes that must be inspected using the embodiments described herein.
Figure 17:
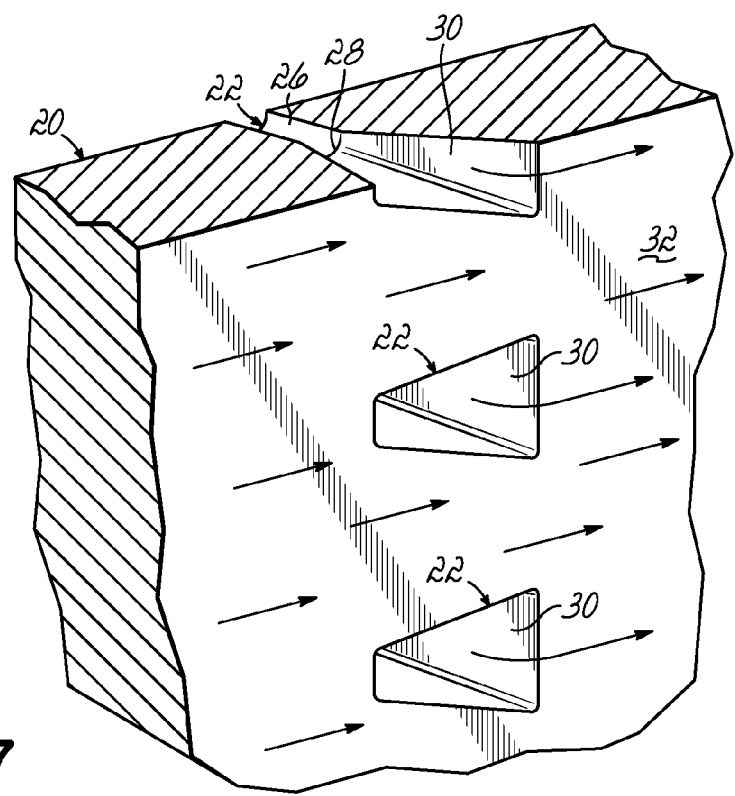
FIG. 17 is a partial perspective and cross-sectional view of a cooling hole in the turbine component illustrated in FIG. 16.

A seventh data analysis method is also similar to the fourth data analysis method except that, again, two IR images are used. A first IR image used was captured before the upstream air pressure was detected, and a second IR image used was captured just after the upstream air pressure was detected. The first image is called the "b_image", and the second image is called the "a_image". In an exemplary embodiment of the seventh data analysis method shown in FIG. 15, the control 48 executes steps 750-756 in a manner similar to that previously described with respect to steps 450-456 of FIG. 11. Upon the control 48 determining, at 756, that the upstream pressure is not activated, the false flag is set true at 760; and, at 761, the current image and associated data are saved as the b_image. The control again iterates the process of steps 750-756; and upon detecting the upstream pressure is not less than 0.5 PSIG, the control 48 then saves the current image and associated data as the a_image.

The control 48 then, at 766, zeros the hole counter; and the standard deviation of a difference between corresponding temperatures in the a_image and the b_image is determined at 768 and saved at 770. This is accomplished by creating a difference array or grid of temperatures equal in number to the number of temperatures in each of the a_image and the b_image. However, in the difference array, the temperature or each array element is created by subtracting a temperature of a corresponding array element in the a_image from a temperature of a corresponding array element in the b_image. The exemplary embodiment of calculating a HOI standard deviation shown and previously described with respect to FIG. 12 may be applied to the difference array of temperatures to determine, at 768, an HOI standard deviation. That HOI standard deviation using the difference array of temperatures is stored at 770. The hole counter is incremented at 772; and if there are other holes to analyze in the a_image and the b_image as determined at 774, the process of steps 766-774 is repeated for each of the holes.

Thereafter, the control 48 calculates, at 776, an average of the HOI standard deviations based on respective HOI standard deviations of the difference array for all of the holes; and the hole counter is zeroed at 778. The control 48 performs, at 780, a HOI analysis that is substantially identical to the HOI analysis that was previously described with respect to FIG. 13. The result is a number of significant points in a current HOI and an area of the HOI. If the control 48 determines, at 782, that the current HOI area is greater than a partial limit, the current HOI is identified, at 784, as a through hole. However, if at 782, the current HOI area is determined not to be greater than a partial limit, the current HOI is identified, at 786, as a blocked hole. The control 48 displays the status of the current HOI at 788, saves the hole status at 789, and increments the hole counter at 790. If the hole counter is determined, at 792, to be less than the number of holes, the process of steps 780-792 is repeated for each of the holes in the difference array.

While the present invention has been illustrated by a description of various embodiments and while these embodiments have been described in considerable detail, there is no intention to restrict or in any way limit the scope of the appended claims to such detail. Additional advantages and modifications will readily appear to those skilled in the art. For example, while the hole inspection processes described herein is directed to an application for inspecting features or holes in a part, in other applications, the described inspection processes can be used to inspect features on other parts, for example, fuel injectors, spray nozzles, combustors, stator blades, etc.

Figure 2A:
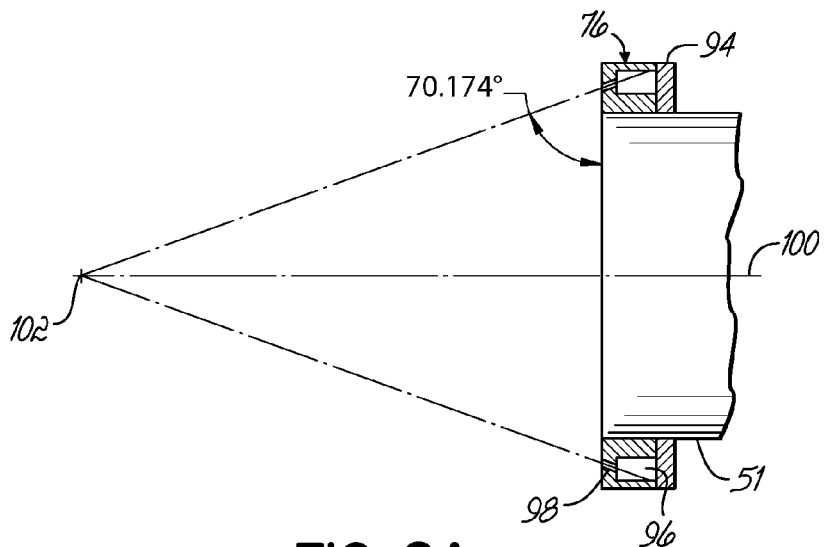
FIG. 2A is a cross-sectional view of an exemplary embodiment of an annular gas discharge nozzle.

In the exemplary embodiments shown in FIGS. 2A and 8, gas discharge nozzles 112 and IR emitters 110 are mounted circumferentially next to each other on a single ring around a lens 51 of an IR camera 50. However, in another alternative embodiment, the gas discharge nozzles 112 may be mounted circumferentially on a first ring of a first diameter, and the IR emitters 110 may be mounted on a second ring of a different diameter. In a further embodiment, the gas discharge nozzles 112 and IR emitters 110 may be mounted elsewhere on the robotic arm as long as they are directed on the same feature(s) as the camera.

It should be noted that in the data analysis methods shown and described herein, it is assumed that all of the features or holes have the same shape and size. If an image frame contains features having different shapes or sizes, then the first step of any analysis is to identify regions of interest within the image frame that contain only features having an identical shapes or sizes. Then the data analysis methods shown and described herein may be implemented with the pixels within that region of interest as well as other regions of interest within the image frame.

Therefore, the invention in its broadest aspects is not limited to the specific details shown and described. Consequently, departures may be made from the details described herein without departing from the spirit and scope of the claims which follow.

What is claimed is:

1. An apparatus for inspecting features extending from a cavity within a structure to an outer surface of the structure, the apparatus comprising:
    a thermal imaging device comprising a lens;
    a positioning system for supporting the thermal imaging device and operable to position the lens at a desired position and orientation with respect to one of the features;
    a heating component supported by the positioning system and operable to heat an area of the outer surface around the one of the features;
    a first source of gas;
    a flow controller connected to the first source of gas and operable to supply a pressure regulated flow of gas;
    a chiller receiving the pressure regulated flow of gas and providing a pressure regulated flow of cooled gas into the cavity and to the one of the features; and
    a programmable control in electrical communications with the thermal imaging device, the positioning system, the heating component, the flow controller and the chiller and operable to first heat the outer surface around the one of the features and thereafter cause the pressure regulated of cooled gas to flow into the cavity, the control being further operable to cause the thermal imaging device to capture and save thermal images of the outer surface including the one of the features.

2. The apparatus of claim 1 wherein the heating component is mounted on the thermal imaging device.

3. The apparatus of claim 1 wherein the heating component is mounted circumferentially around the lens of the thermal imaging device.

4. The apparatus of claim 1 wherein the heating component heats the area of the outer surface by thermal radiation.

5. The apparatus of claim 1 wherein the heating component heats the area of the outer surface by thermal convection.

6. The apparatus of claim 1 wherein the heating component comprises:
    a second source of gas;
    a flow controller connected to the second source of gas and operable to supply a second pressure regulated flow of gas; and
    a heater receiving the second pressure regulated flow of gas and providing a pressure regulated flow of heated gas onto the outer surface around the one of the features.

7. The apparatus of claim 6 wherein the heating component further comprises:
    a plurality of nozzles mounted circumferentially around the lens of the thermal imaging device, the plurality of nozzles being in fluid communication with the pressure regulated flow of heated gas; and
    a plurality of infrared emitters mounted circumferentially around the lens of the thermal imaging device.

8. A method of inspecting features extending from a cavity within a structure to an outer surface of the structure, the method comprising:
  (a) positioning a thermal imaging device at a desired position and orientation with respect to one of the features;
  (b) heating an area of the outer surface including the one of the features;
  (c) thereafter, initiating a pressure regulated flow of a cooled gas into the cavity to the one of the features;
  (d) thereafter, capturing a first thermal image of the area of the outer surface including the one of the features; and
  (e) saving the first thermal image;
  (f) terminating the pressure regulated flow of the cooled gas; and
  (h) iterating steps (a)-(f) for others of the features.

9. The method of claim 8 wherein heating an area of the outer surface continues for a programmable period of time before initiating a pressure regulated flow of a cooled gas.

10. The method of claim 9 wherein the pressure regulated flow of a cooled gas continues for a programmable period of time before capturing a first thermal image.

11. The method of claim 10 wherein the method further comprises capturing and saving a second thermal image of the area of the outer surface a programmable period of time after capturing the first thermal image.

12. The method of claim 8 wherein capturing a first thermal image comprises capturing a plurality of first thermal images of the area of the outer surface starting immediately after initiating a pressure regulated flow of a cooled gas.

13. The method of claim 12 wherein the method further comprises capturing and saving a plurality of second thermal images of the area of the outer surface while heating an area of the outer surface.

14. The method of claim 13 wherein capturing a plurality of second thermal images further comprises:
  capturing one of the second thermal images;
  pausing for a first period of time;
  capturing another of the second thermal images; and
  iterating the steps of capturing, pausing and capturing for a second period of time.

15. The method of claim 13 wherein the method further comprises analyzing at least one of the first and the second thermal images to identify a qualitative characteristic of the one of the feature.

16. The method of claim 12 wherein capturing a plurality of first thermal images further comprises:
  capturing one of the first thermal images;
  pausing for a first period of time;
  capturing another of the first thermal images; and
  iterating the steps of capturing, pausing and capturing for a second period of time.

17. The method of claim 8 wherein heating an area of the outer surface comprises heating the area of the outer surface by thermal radiation.

18. The method of claim 8 wherein heating an area of the outer surface comprises heating the area of the outer surface by thermal convection.

19. The method of claim 18 wherein heating an area of the outer surface further comprises heating the area of the outer surface by thermal radiation.

20. The method of claim 8 wherein heating an area of the outer surface comprises initiating a pressure regulated flow of a heated gas over the area of the outer surface.

21. The method of claim 20 wherein the heated gas and the cooled gas are air.

22. The method of claim 20 wherein the heated gas is air and the cooled gas is helium.

* * * * *